(12) United States Patent
Choi et al.

(10) Patent No.: US 11,917,138 B2
(45) Date of Patent: Feb. 27, 2024

(54) VIDEO ENCODING METHOD AND APPARATUS, AND VIDEO DECODING METHOD AND APPARATUS

(71) Applicant: SAMSUNG ELECTRONICS CO., LTD., Suwon-si (KR)

(72) Inventors: Narae Choi, Suwon-Si (KR); Minwoo Park, Suwon-Si (KR); Chanyul Kim, Suwon-Si (KR); Minsoo Park, Suwon-Si (KR); Yumi Sohn, Suwon-Si (KR); Seungsoo Jeong, Suwon-Si (KR); Kiho Choi, Suwon-Si (KR); Woongil Choi, Suwon-Si (KR); Anish Tamse, Suwon-Si (KR); Yinji Piao, Suwon-Si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/827,058

(22) Filed: May 27, 2022

(65) Prior Publication Data
US 2022/0295050 A1    Sep. 15, 2022

Related U.S. Application Data

(63) Continuation of application No. 17/071,600, filed on Oct. 15, 2020, now Pat. No. 11,350,089, which is a
(Continued)

(51) Int. Cl.
*H04N 11/02* (2006.01)
*H04N 19/11* (2014.01)
*H04N 19/176* (2014.01)

(52) U.S. Cl.
CPC ........... *H04N 19/11* (2014.11); *H04N 19/176* (2014.11)

(58) Field of Classification Search
CPC ..................................................... H04N 19/11
(Continued)

(56) References Cited

U.S. PATENT DOCUMENTS 8,644,382 B2 *  2/2014  Tsukuba ............... H04N 19/139
                                                                382/238
9,100,649 B2 *  8/2015  Park ..................... H04N 19/176
(Continued)

FOREIGN PATENT DOCUMENTS

GB          2498234 A      7/2013
KR    10-2013-0034559 A    4/2013
(Continued)

OTHER PUBLICATIONS

Communication dated Mar. 21, 2022 by the European Patent Office in counterpart European Patent Application No. 19799907.1.
(Continued)

*Primary Examiner* — Leron Beck
(74) *Attorney, Agent, or Firm* — Sughrue Mion, PLLC

(57) ABSTRACT

Provided are a video decoding method and apparatus and a video encoding method and apparatus which determine whether to use a Most Probable Mode (MPM) list, based on encoding information of a current block, obtain, from a bitstream, intra prediction mode index information indicating one of candidate intra prediction modes included in the MPM list, and determine an intra prediction mode of the current block by using the obtained intra prediction mode index information.

3 Claims, 39 Drawing Sheets

Related U.S. Application Data continuation of application No. PCT/KR2019/005666, filed on May 10, 2019.

(60) Provisional application No. 62/792,272, filed on Jan. 14, 2019, provisional application No. 62/669,650, filed on May 10, 2018.

(58) Field of Classification Search
USPC .............................................. 375/240.01–29
See application file for complete search history.

(56) References Cited

U.S. PATENT DOCUMENTS

| | | | |
|---|---|---|---|
| 9,154,796 B2 | 10/2015 | Seregin et al. | |
| 9,277,224 B2* | 3/2016 | Song ...................... | H04N 19/14 |
| 9,319,683 B2* | 4/2016 | Lim ....................... | H04N 19/625 |
| 9,363,511 B2* | 6/2016 | Zhang .................... | H04N 19/61 |
| 9,479,783 B2 | 10/2016 | Seregin et al. | |
| 9,699,456 B2 | 7/2017 | Chien et al. | |
| 9,877,030 B2 | 1/2018 | Song et al. | |
| 10,091,503 B2 | 10/2018 | Lee et al. | |
| 10,687,056 B2 | 6/2020 | Francois et al. | |
| 10,812,795 B2 | 10/2020 | Jang et al. | |
| 10,944,965 B2 | 3/2021 | Oh et al. | |
| 2006/0153292 A1* | 7/2006 | Liang .................... | H04N 19/136 |
| | | | 375/E7.176 |
| 2012/0106636 A1* | 5/2012 | Kim ....................... | H04N 19/11 |
| | | | 375/E7.243 |
| 2012/0307894 A1* | 12/2012 | Chien ................... | H04N 19/176 |
| | | | 375/E7.243 |
| 2012/0314766 A1* | 12/2012 | Chien .................... | H04N 19/11 |
| | | | 375/E7.243 |
| 2013/0016774 A1* | 1/2013 | Oh ......................... | H04N 19/50 |
| | | | 375/240.03 |
| 2013/0094776 A1* | 4/2013 | Lainema .............. | H04N 19/593 |
| | | | 382/233 |
| 2013/0114707 A1* | 5/2013 | Seregin .................. | H04N 19/11 |
| | | | 375/E7.243 |
| 2013/0136175 A1* | 5/2013 | Wang .................... | H04N 19/157 |
| | | | 375/240.12 |
| 2013/0266064 A1* | 10/2013 | Zhang .................... | H04N 19/61 |
| | | | 375/240.12 |
| 2013/0336406 A1* | 12/2013 | Zhang .................. | H04N 19/597 |
| | | | 375/240.16 |
| 2015/0139314 A1* | 5/2015 | Seregin ................ | H04N 19/109 |
| | | | 375/240.12 |
| 2015/0365692 A1 | 12/2015 | Liu et al. | |
| 2016/0134867 A1 | 5/2016 | Oh et al. | |
| 2016/0316201 A1 | 10/2016 | Lee et al. | |
| 2018/0184082 A1* | 6/2018 | Yoo ....................... | H04N 19/159 |
| 2018/0316913 A1* | 11/2018 | Jun ....................... | H04N 19/176 |
| 2020/0045335 A1 | 2/2020 | Lee et al. | |
| 2020/0236352 A1 | 7/2020 | Lee et al. | |

FOREIGN PATENT DOCUMENTS

| | | |
|---|---|---|
| KR | 10-2016-0051343 A | 5/2016 |
| KR | 10-1737607 B1 | 5/2017 |
| KR | 10-1824241 B1 | 3/2018 |
| KR | 10-2018-0039755 A | 4/2018 |
| KR | 10-2018-0041577 A | 4/2018 |
| KR | 10-2018-0042829 A | 4/2018 |
| RU | 2573744 C2 | 1/2016 |
| RU | 2 575 992 C2 | 2/2016 |
| RU | 2 584 498 C2 | 5/2016 |
| RU | 2 619 706 C2 | 5/2017 |
| RU | 2 659 733 C2 | 7/2018 |
| WO | 2018/062788 A1 | 4/2018 |

OTHER PUBLICATIONS

Van Der Auwera, Geert et al., "Description of Core Experiment 3: Intra Prediction and Mode Coding", Joint Video Experts Team (JVET) of ITU-T SG 16 WP 3 and ISO/IEC JTC 1/SC 29/WG 11, 10th Meeting: San Diego, USA, Apr. 20, 2018, Document: JVET-J1023., XP030262019. (44 pages total).

Albrecht, M. et al., "Description of SDR, HDR, and 360 video coding technology proposal by Fraunhofer HHI", Joint Video Experts Team (JVET) of ITU-T SG 16 WP 3 and ISO/IEC JTC 1/SC 29/WG 11, 10th Meeting: San Diego, US, Apr. 2, 2018, Document: JVET-J0014-v1, XP030261323. (118 pages total).

Communication dated Sep. 17, 2021 by the Federation Intellectual Property Office of Russia in counterpart Russian Patent Application No. 2020140417.

Communication dated Feb. 9, 2021 by the Korean Intellectual Property Office in corresponding Korean Application No. 10-2020-7021739.

International Search Report (PCT/ISA/210) dated Aug. 27, 2019 by the International Searching Authority in counterpart International Patent Application No. PCT/KR2019/005666.

Written Opinion (PCT/ISA/237) dated Aug. 27, 2019 by the International Searching Authority in counterpart International Patent Application No. PCT/KR2019/005666.

International Preliminary Report (PCT/IB/373) dated Nov. 10, 2020 by the International Searching Authority in counterpart International Patent Application No. PCT/KR2019/005666.

NOA, Federal Service for Intellectual Property, dated Dec. 1, 2022, issued by the Russian Intellectual Property Office, Application No. 2022108221.

Communication dated Aug. 25, 2022, issued by the India Intellectual Property Office in Indian Patent English Application No. 202047047129.

Office Action dated May 23, 2023, issued by Indonesian Patent Office in Indonesian Patent Application No. P00202008387.

Office Action dated Jul. 3, 2023, issued by Russian Patent Office in Russian Patent Application No. 2023100791.

Choi et al., "CE3.3 related: Intra 67 modes coding with 3MPM", Joint Video Experts Team (JVET) of ITU-T SG 16 WP 3 and ISO/IEC JTC 1/SC 29/WG 11, Jul. 17, 2018, 7 total pages.

Communication dated Nov. 2, 2023 by the Russian Patent Office in Russian Patent Application No. 2023100791.

L.M. Nevdjaev, "Explanatory dictionary-reference book", Series of publications Communication and Business, Moscow, 2002. (5 pages total).

ISO 2382-1:1993, Discussion at ISO/IEC JTC1/SC1/WG4, Stockholm, May 1998, (http://www.morepc.ru/informatisation/iso2381-1.html). (31 pages total).

\* cited by examiner

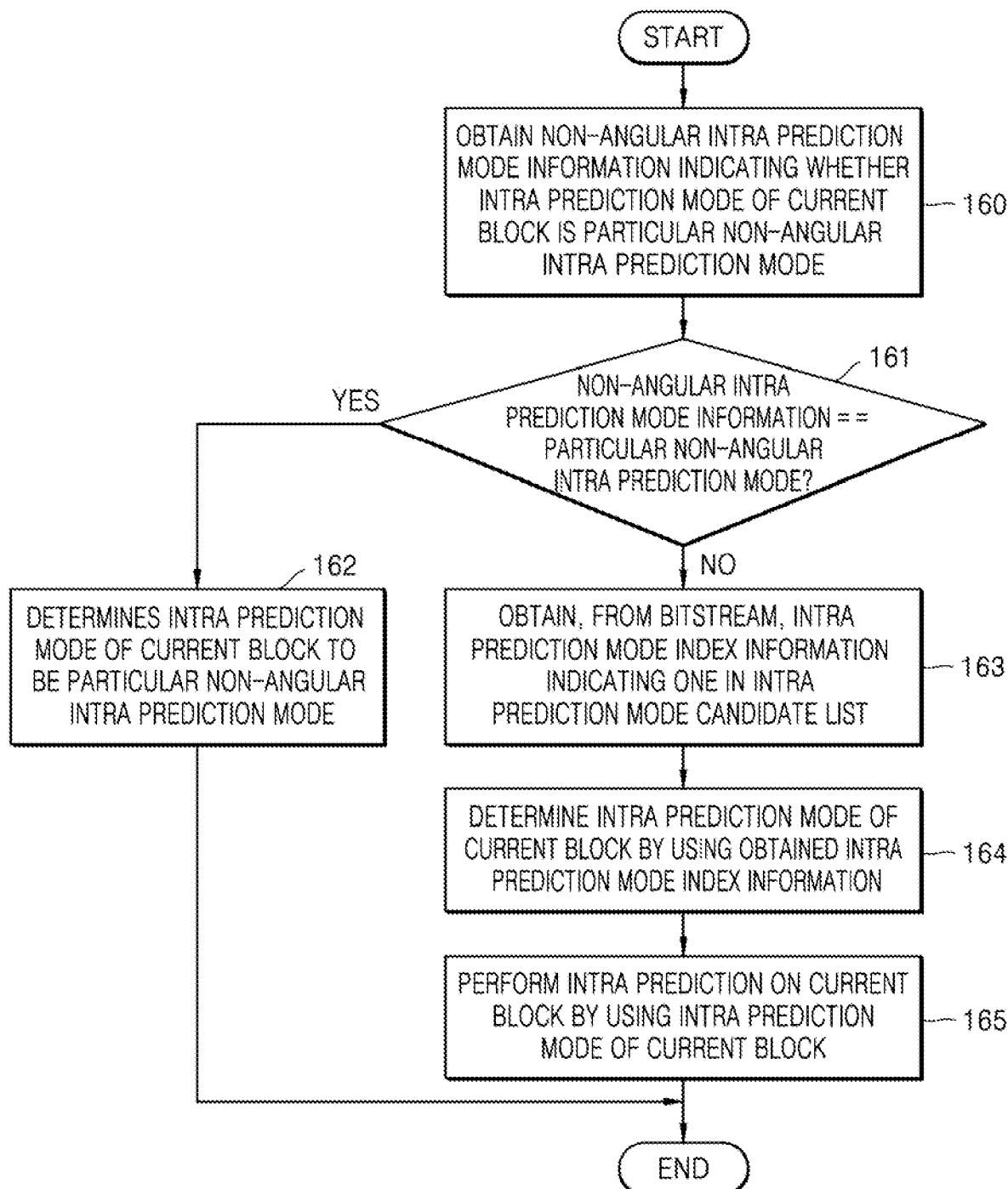

FIG. 13

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 27

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | – | 32 | 26 | 21 | 17 | 13 | 9 | 5 | 2 | 0 | -2 | -5 | -9 | -13 | -17 | -21 | -26 |
| intraPredAngle for non-square | – | 48 | 40 | 32 | 26 | 20 | 14 | 8 | 4 | 0 | -4 | -8 | -14 | -20 | -26 | -32 | -24 |
| predModeIntra | 18 | 19 | 20 | 21 | 22 | 23 | 24 | 25 | 26 | 27 | 28 | 29 | 30 | 31 | 32 | 33 | 34 |
| intraPredAngle | -32 | -26 | -21 | -17 | -13 | -9 | -5 | -2 | 0 | 2 | 5 | 9 | 13 | 17 | 21 | 26 | 32 |
| intraPredAngle for non-square | -16 | -13 | -10 | -8 | -6 | -4 | -2 | -1 | 1 | 2 | 4 | 6 | 8 | 10 | 13 | 16 |

FIG. 28

| predModeIntra | -14 | -13 | -12 | -11 | -10 | -9 | -8 | -7 | -6 | -5 | -4 | -3 | -2 | -1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | -1 | -2 | -3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | -4 | -6 | -8 | -10 | -12 | -14 | -16 | -18 | -20 | -23 | -26 | -29 | -32 | -29 | -26 | -23 | -20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | -18 | -16 | -14 | -12 | -10 | -8 | -6 | -4 | -3 | -2 | -1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

VIDEO ENCODING METHOD AND APPARATUS, AND VIDEO DECODING METHOD AND APPARATUS

CROSS-REFERENCE TO RELATED APPLICATIONS

This application is a Continuation application of U.S. patent application Ser. No. 17/071,600, filed Oct. 15, 2020, which is a Continuation application of International Application No. PCT/KR2019/005666 filed on May 10, 2019, which claims priority to U.S. Provisional Application No. 62/792,272 filed on Jan. 14, 2019 and U.S. Provisional Application No. 62/669,650 filed on May 10, 2018, the contents of all of which are incorporated herein by reference in their entirety.

TECHNICAL FIELD

The disclosure relates to a video decoding method and apparatus, and a video encoding method and apparatus, and more particularly, to encoding and decoding of an intra prediction mode of a current block by using intra prediction mode information of an adjacent block.

BACKGROUND ART

Image data is encoded by a predetermined codec conforming to a data compression standard, e.g., the Moving Picture Expert Group (MPEG) standard, and then is stored in a recording medium or transmitted through a communication channel in the form of a bitstream. Recently, due to the evolution of wired/wireless communication infrastructures including 5th generation (5G), there is an increasing demand for a technology for efficiently compressing next-generation media such as 4K/8K ultra high definition (UHD) videos, 360-degree videos, virtual reality (VR) images, and the like, in addition to existing image media.

DESCRIPTION OF EMBODIMENTS

Technical Problem

When the number of intra prediction modes to be used in intra prediction is increased, the amount of information required to represent the intra prediction modes may be increased.

Solution to Problem

According to various embodiments, candidate intra prediction modes having a high probability to be an intra prediction mode of a current block are determined by using prediction mode information of adjacent blocks of the current block, and an intra prediction mode of the current block is encoded and decoded by using the candidate intra prediction modes.

Advantageous Effects of Disclosure

According to various embodiments, a bit amount required to represent intra prediction mode information of a current block may be decreased.

BRIEF DESCRIPTION OF DRAWINGS

FIG. 1C illustrates a flowchart of an image decoding method according to another embodiment.

FIG. 13 illustrates a process of determining a depth of a coding unit as a shape and size of the coding unit change, when the coding unit is recursively split such that a plurality of coding units are determined, according to an embodiment.

FIG. 27 illustrates a look-up table showing mapping relations between intra prediction mode indices (predModeIntra) and angle parameters (IntraPredAngle) according to intra prediction modes, according to an embodiment.

FIG. 28 illustrates a look-up table showing mapping relations between intra prediction mode indices (predModeIntra) and angle parameters (IntraPredAngle) according to intra prediction modes, according to another embodiment.

BEST MODE

Figure 1A:
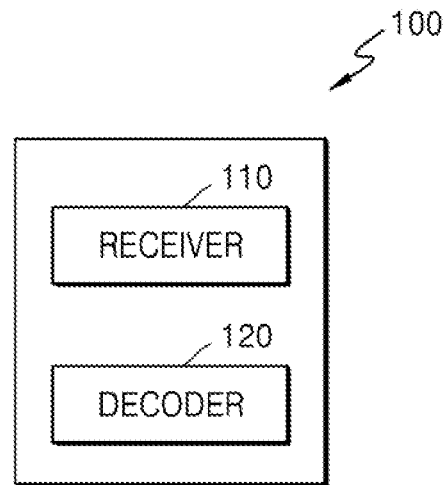
FIG. 1A is a block diagram of an image decoding apparatus, according to various embodiments.

According to an embodiment, a video decoding method includes: determining, based on encoding information of a current block, whether an intra prediction mode of the current block is to be determined from an intra prediction mode candidate list obtained by using a plurality of pieces of prediction mode information of adjacent blocks adjacent to the current block; when the intra prediction mode of the current block is to be determined from the intra prediction mode candidate list, obtaining, from a bitstream, intra prediction mode index information indicating one of candidate intra prediction modes included in the intra prediction mode candidate list; determining the intra prediction mode of the current block by using the obtained intra prediction mode index information; and performing intra prediction on the current block by using the intra prediction mode of the current block.

According to an embodiment, the encoding information may include reference sample information to be used in the intra prediction with respect to the current block, and sub-partition information indicating whether the current block is to be split into sub-partitions, when the reference sample information indicates that an adjacent pixel that is not directly adjacent to the current block is to be used as a reference sample of the current block, or the sub-partition information indicates that the current block is to be split into the sub-partitions, the intra prediction mode of the current block is determined from the intra prediction mode candidate list, when the reference sample information indicates that an adjacent pixel that is directly adjacent to the current block is to be used as a reference sample of the current block, and the sub-partition information indicates that the current block is to not be split into the sub-partitions, intra prediction mode candidate list flag information is obtained from the bitstream, the intra prediction mode candidate list flag information indicating whether the intra prediction mode of the current block is to be determined from the intra prediction mode candidate list obtained by using the plurality of pieces of prediction mode information of the adjacent blocks adjacent to the current block.

According to an embodiment, the obtaining of the intra prediction mode index information from the bitstream may include obtaining non-angular intra prediction mode information indicating whether the intra prediction mode of the current block is a particular non-angular intra prediction mode, and when the non-angular intra prediction mode information does not indicate the particular non-angular intra prediction mode, obtaining the intra prediction mode index information from the bitstream.

According to an embodiment, the particular non-angular intra prediction mode may be one of a DC mode and a planar mode.

According to an embodiment, when the non-angular intra prediction mode information indicates the particular non-angular intra prediction mode, the intra prediction mode of the current block may be determined to be the particular non-angular intra prediction mode.

According to an embodiment, when the intra prediction mode of the current block is not determined from the intra prediction mode candidate list, intra prediction mode information of the current block may be obtained from the bitstream.

According to an embodiment, the intra prediction mode candidate list may include a predetermined number of candidate intra prediction modes determined by using a prediction mode of an adjacent block adjacent in a right side of the current block and a prediction mode of an adjacent block adjacent in an upper side of the current block.

According to an embodiment, a video decoding apparatus includes: a memory; and at least one processor connected to the memory and configured to determine, based on encoding information of a current block, whether an intra prediction mode of the current block is to be determined from an intra prediction mode candidate list obtained by using a plurality of pieces of prediction mode information of adjacent blocks adjacent to the current block; when the intra prediction mode of the current block is to be determined from the intra prediction mode candidate list, obtain, from a bitstream, intra prediction mode index information indicating one of candidate intra prediction modes included in the intra prediction mode candidate list; determine the intra prediction mode of the current block by using the obtained intra prediction mode index information; and perform intra prediction on the current block by using the intra prediction mode of the current block.

According to an embodiment, a video encoding method includes: determining an intra prediction mode of a current block; determining, based on encoding information of the current block, whether the intra prediction mode of the current block is to be determined from an intra prediction mode candidate list obtained by using a plurality of pieces of prediction mode information of adjacent blocks adjacent to the current block; and when the intra prediction mode of the current block is to be determined from the intra prediction mode candidate list, generating a bitstream including intra prediction mode index information indicating one of candidate intra prediction modes included in the intra prediction mode candidate list.

MODE OF DISCLOSURE

Advantages and features of embodiments and methods of accomplishing the same may be understood more readily by reference to the embodiments and the accompanying drawings. In this regard, the disclosure may have different forms and should not be construed as being limited to the embodiments set forth herein. Rather, these embodiments are provided so that this disclosure will be thorough and complete and will fully convey the concept of the disclosure to one of ordinary skill in the art.

The terms used in the specification will be briefly defined, and the embodiments will be described in detail.

All terms including descriptive or technical terms which are used in the specification should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Therefore, the terms used in the disclosure should not be interpreted based on only their names but have to be defined based on the meaning of the terms together with the descriptions throughout the specification.

In the following specification, the singular forms include plural forms unless the context clearly indicates otherwise.

When a part "includes" or "comprises" an element, unless there is a particular description contrary thereto, the part may further include other elements, not excluding the other elements.

In the following descriptions, terms such as "unit" indicate software or a hardware component, and the "unit" performs certain functions. However, the "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

According to an embodiment of the disclosure, "unit" may be implemented as a processor and a memory. The term "processor" should be interpreted broadly to include a general purpose processor, a central processing unit (CPU), a microprocessor, a digital signal processor (DSP), a controller, a microcontroller, a state machine, and the like. In some environments, the "processor" may refer to an application specific semiconductor (ASIC), a programmable logic device (PLD), a field programmable gate array (FPGA), or the like. The term "processor" may refer to a combination of processing devices such as, for example, a combination of a DSP and a microprocessor, a combination of a plurality of microprocessors, a combination of one or more microprocessors in conjunction with a DSP core, or a combination of any other such configurations.

The term "memory" should be interpreted broadly to include any electronic component capable of storing electronic information. The term "memory" may refer to various types of processor-readable media, such as a random access memory (RAM), a read-only memory (ROM), a non-volatile random access memory (NVRAM), a programmable read-only memory (PROM), an erase-programmable read-only memory (EPROM), an electrically erasable PROM (EEPROM), a flash memory, a magnetic or optical data storage device, registers, and the like. When the processor can read information from a memory and/or write information to the memory, the memory is said to be in an electronic communication state with the processor. The memory integrated in the processor is in an electronic communication state with the processor.

Hereinafter, an "image" may be a static image such as a still image of a video or may be a dynamic image such as a moving image, that is, the video itself.

Hereinafter, a "sample" denotes data assigned to a sampling position of an image, i.e., data to be processed. For example, pixel values of an image in a spatial domain and transform coefficients on a transform domain may be samples. A unit including at least one such sample may be defined as a block.

Hereinafter, the disclosure will now be described more fully with reference to the accompanying drawings for one of ordinary skill in the art to be able to perform the embodiments without any difficulty. In addition, portions irrelevant to the description will be omitted in the drawings for a clear description of the disclosure.

Hereinafter, an image encoding apparatus and an image decoding apparatus, and an image encoding method and an image decoding method according to embodiments will be described with reference to FIGS. 1A to 29. With reference to FIGS. 3 to 16, a method of determining a data unit of an image according to an embodiment will be described, and with reference to FIGS. 1A to 2E, and 17 to 29, methods of encoding and decoding an intra prediction mode will be described.

Hereinafter, the image encoding or decoding method and apparatus for adaptively performing intra prediction, based on various-shape coding units, according to an embodiment of the disclosure, will now be described with reference to FIGS. 1A to 2E.

FIG. 1A is a block diagram of an image decoding apparatus, according to various embodiments.

An image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information of an image encoded by an image encoding apparatus 150 to be described below. Also, the bitstream may be transmitted from an image encoding apparatus 150. The image encoding apparatus 150 and the image decoding apparatus 100 may be connected by wire or wirelessly, and the receiver 110 may receive the bitstream by wire or wirelessly. The receiver 110 may receive the bitstream from a storage medium such as an optical medium or a hard disk. The decoder 120 may reconstruct an image based on information obtained from the received bitstream. The decoder 120 may obtain, from the bitstream, a syntax element for reconstructing the image. The decoder 120 may reconstruct the image based on the syntax element.

The receiver 110 may obtain, from the bitstream, prediction mode information about a current block and intra prediction mode information about the current block.

The prediction mode information about the current block, which is included in the bitstream, may include information about a skip mode, an intra mode, or an inter prediction mode. When the current block does not correspond to the skip mode, which prediction mode from among the intra mode or the inter prediction mode was used to encode the current block may be signaled.

The intra prediction mode information about the current block may be information about an intra prediction mode to be applied to the current block, the intra prediction mode being from among a plurality of intra prediction modes. For example, the intra prediction mode may be one of non-angular modes including a DC mode, a planar mode, a plane mode, and a bi-linear mode, and a plurality of angular modes having prediction directions. The angular modes may include a horizontal mode, a vertical mode, and a diagonal mode, and may also include modes having predetermined directions excluding a horizontal direction, a vertical direction, and a diagonal direction. For example, the number of the angular modes may be 65 or 33.

The decoder 120 may obtain a prediction block of the current block, based on a prediction mode of the current block. The decoder 120 may obtain, from the bitstream, transform coefficient information about the current block, may perform inverse quantization and inverse transformation by using the obtained transform coefficient information, and thus may obtain a residual sample of a residual block with respect to the current block.

As will be described below, according to an embodiment, the decoder 120 determines, based on encoding information of a current block, whether an intra prediction mode of the current block is to be determined from an intra prediction mode candidate list obtained by using a plurality of pieces of prediction mode information of adjacent blocks adjacent to the current block. When the intra prediction mode of the current block is to be determined from the intra prediction mode candidate list, the decoder 120 obtains, from a bitstream, intra prediction mode index information indicating one of candidate intra prediction modes included in the intra prediction mode candidate list, and determines the intra prediction mode of the current block by using the obtained intra prediction mode index information. Afterward, the decoder 120 performs intra prediction by using the intra prediction mode of the current block. According to an embodiment, the decoder 120 obtains non-angular intra prediction mode information indicating whether the intra prediction mode of the current block is a particular non-angular intra prediction mode. The particular non-angular intra prediction mode may be one of a DC mode and a planar mode. When the non-angular intra prediction mode information indicates the particular non-angular intra prediction mode, the decoder 120 determines the intra prediction mode of the current block to be the particular non-angular intra prediction mode, and when the non-angular intra prediction mode information does not indicate the particular non-angular intra prediction mode, the decoder 120 obtains, from the bitstream, the intra prediction mode index information indicating one in the intra prediction mode candidate list obtained based on prediction mode information of an adjacent block adjacent to the current block. Afterward, the decoder 120 may determine the intra prediction mode of the current block by using the obtained intra prediction mode index information (MPM idx), and may perform intra prediction on the current block by using the intra prediction mode of the current block. The decoder 120 may reconstruct the current block, based on the prediction block of the current block and a residual block of the current block. The decoder 120 may generate a reconstructed sample in the current block by using a sample value of a prediction sample in the prediction block of the current block and a sample value of a residual sample in the residual block of the current block, and may generate a reconstructed block of the current block based on the reconstructed sample.

Figure 1B:
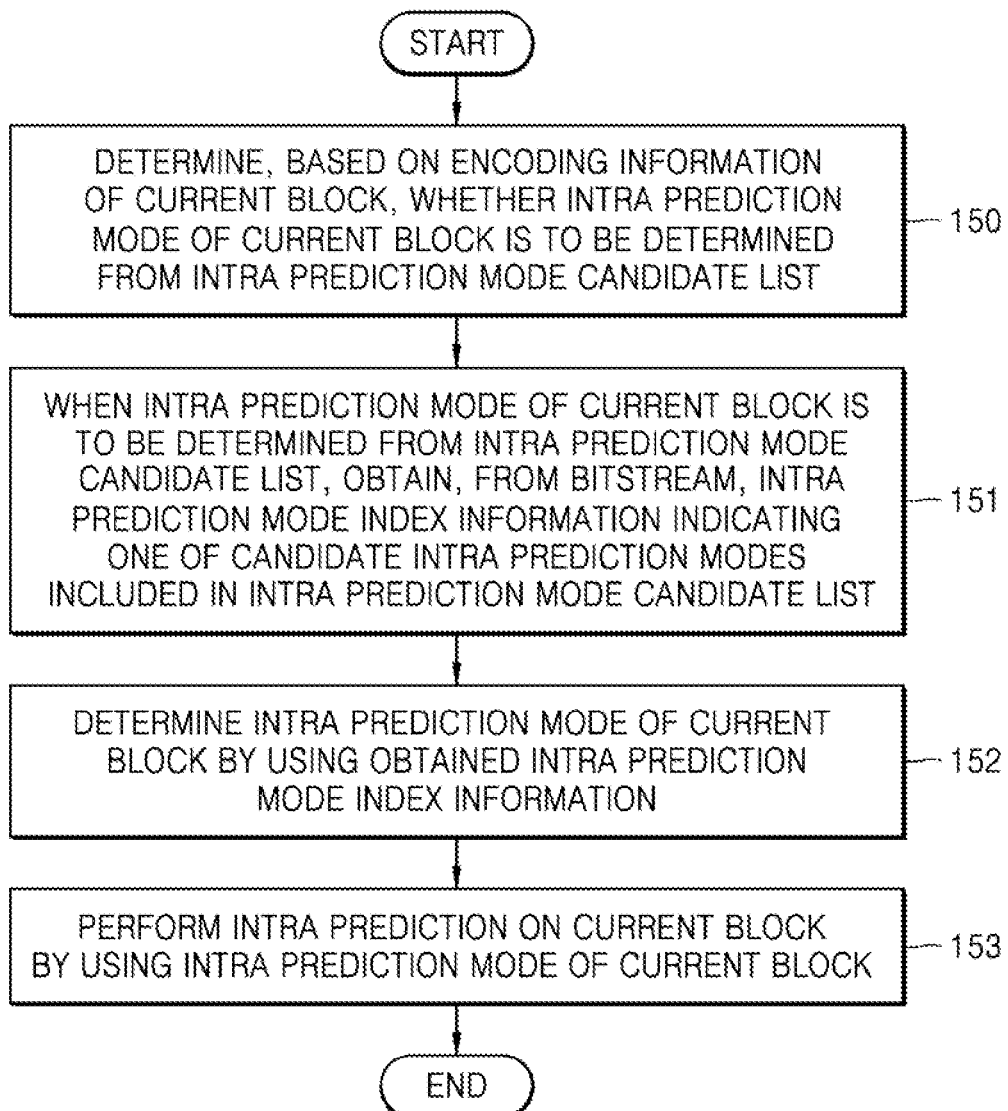
FIG. 1B illustrates a flowchart of an image decoding method according to an embodiment.

FIG. 1B illustrates a flowchart of an image decoding method according to an embodiment.

In operation 150, the decoder 120 determines, based on encoding information of a current block, whether an intra prediction mode of the current block is to be determined from an intra prediction mode candidate list obtained by using a plurality of pieces of prediction mode information of adjacent blocks adjacent to the current block.

In operation 151, when the intra prediction mode of the current block is to be determined from the intra prediction mode candidate list, the decoder 120 obtains, from a bitstream, intra prediction mode index information indicating one of candidate intra prediction modes included in the intra prediction mode candidate list, and in operation 152, the decoder 120 determines the intra prediction mode of the current block by using the obtained intra prediction mode index information.

In operation 153, the decoder 120 performs intra prediction by using the intra prediction mode of the current block.

FIG. 1C illustrates a flowchart of an image decoding method according to another embodiment.

In operation 160, the decoder 120 obtains non-angular intra prediction mode information indicating whether an intra prediction mode of a current block is a particular non-angular intra prediction mode. The particular non-angular intra prediction mode may be one of a DC mode and a planar mode.

In operation 161, the decoder 120 determines whether the non-angular intra prediction mode information is the particular non-angular intra prediction mode. As a result of the determination in operation 161, when the non-angular intra prediction mode information indicates the particular non-angular intra prediction mode, in operation 162, the decoder 120 determines the intra prediction mode of the current block to be the particular non-angular intra prediction mode, and when the non-angular intra prediction mode information does not indicate the particular non-angular intra prediction mode, in operation 163, the decoder 120 obtains, from a bitstream, intra prediction mode index information indicating one in an intra prediction mode candidate list obtained based on prediction mode information of an adjacent block adjacent to the current block. In operation 164, the decoder 120 may determine the intra prediction mode of the current block by using the obtained intra prediction mode index information (MPM idx), and in operation 165, the decoder 120 may perform intra prediction on the current block by using the intra prediction mode of the current block.

Figure 1D:
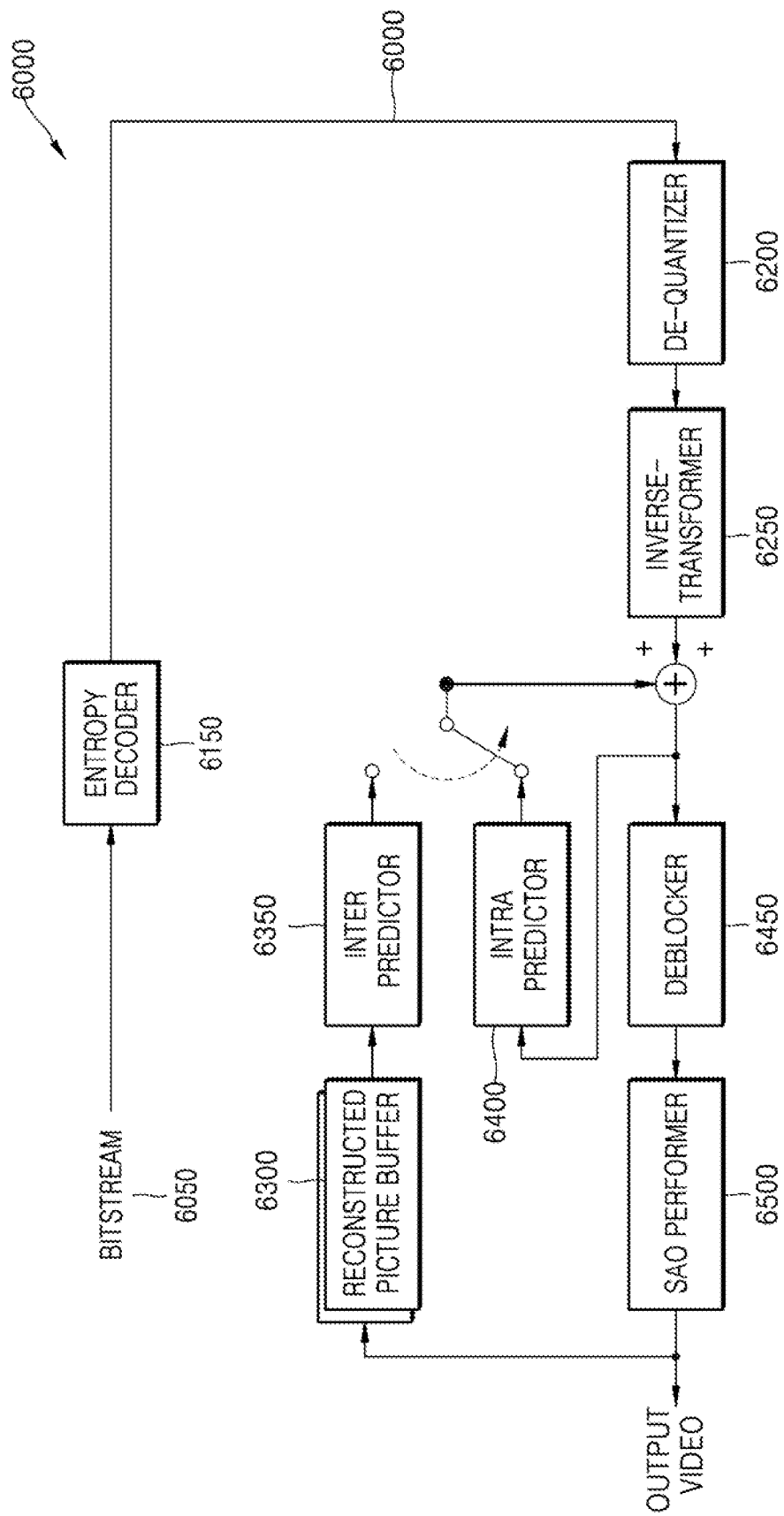
FIG. 1D is a block diagram of an image decoder according to various embodiments.

FIG. 1D is a block diagram of an image decoder 6000 according to various embodiments.

The image decoder 6000 according to various embodiments performs operations necessary for the decoder 120 of the image decoding apparatus 100 to decode image data.

Referring to FIG. 1D, an entropy decoder 6150 parses, from a bitstream 6050, encoded image data to be decoded, and encoding information necessary for decoding. The encoded image data is a quantized transform coefficient, and a de-quantizer 6200 and an inverse-transformer 6250 reconstruct residual data from the quantized transform coefficient.

An intra predictor 6400 performs intra prediction on each of blocks. As will be described below, according to an embodiment, the intra predictor 6400 determines, based on encoding information of a current block, whether an intra prediction mode of the current block is to be determined from an intra prediction mode candidate list obtained by using a plurality of pieces of prediction mode information of adjacent blocks adjacent to the current block, and when the intra prediction mode of the current block is to be determined from the intra prediction mode candidate list, the intra predictor 6400 obtains, from a bitstream, intra prediction mode index information indicating one of candidate intra prediction modes included in the intra prediction mode candidate list, and determines the intra prediction mode of the current block by using the obtained intra prediction mode index information.

An inter predictor 6350 performs inter prediction on each block by using a reference image obtained from a reconstructed picture buffer 6300. Data of a spatial domain for a block of a current image may be reconstructed by adding residual data and prediction data of each block which are generated by the intra predictor 6400 or the inter predictor 6350, and a deblocker 6450 and a sample adaptive offset (SAO) performer 6500 may perform loop filtering on the reconstructed data of the spatial domain, such that a filtered reconstructed image may be output. Reconstructed images stored in the reconstructed picture buffer 6300 may be output as a reference image.

In order for the decoder 120 of the image decoding apparatus 100 to encode the image data, the image decoder 6000 according to various embodiments may perform operations of each stage on each block.

Figure 1E:
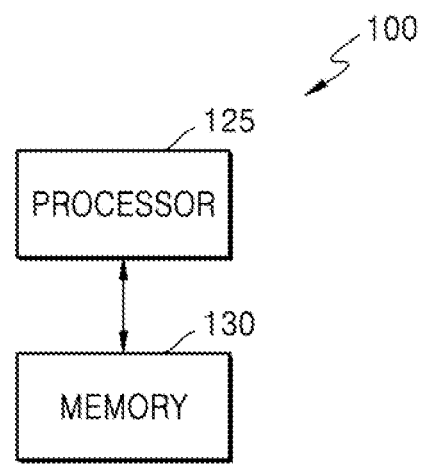
FIG. 1E is a block diagram of an image decoding apparatus according to various embodiments.

FIG. 1E is a block diagram of the image decoding apparatus 100 according to an embodiment.

The image decoding apparatus 100 according to an embodiment may include a memory 130 and at least one processor 125 connected with the memory 130. Operations of the image decoding apparatus 100 according to an embodiment may be performed by individual processors or may be performed by the control of a central processor. Also, the memory 130 of the image decoding apparatus 100 may store data received from an external source, and data generated by a processor. The processor 125 of the image decoding apparatus 100 may determine, based on encoding information of a current block, whether an intra prediction mode of a current block is to be determined from an intra prediction mode candidate list obtained by using a plurality of pieces of prediction mode information of adjacent blocks adjacent to the current block, and when the intra prediction mode of the current block is to be determined from the intra prediction mode candidate list, the processor 125 may obtain, from a bitstream, intra prediction mode index information indicating one of candidate intra prediction modes included in the intra prediction mode candidate list, and may determine the intra prediction mode of the current block by using the obtained intra prediction mode index information.

Figure 2A:
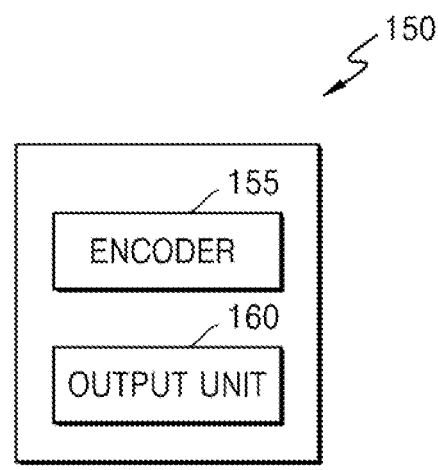
FIG. 2A is a block diagram of an image encoding apparatus, according to various embodiments.

FIG. 2A is a block diagram of an image encoding apparatus, according to various embodiments.

The image encoding apparatus 150 according to various embodiments may include an encoder 155 and an output unit 160.

The encoder 155 and the output unit 160 may include at least one processor. Also, the encoder 155 and the output unit 160 may include a memory storing instructions to be performed by the at least one processor. The encoder 155 and the output unit 160 may be implemented as separate hardware components, or the encoder 155 and the output unit 160 may be included in one hardware component.

The encoder 155 determines a prediction mode of a current block by applying various prediction modes including a skip mode, an intra mode, an inter prediction mode, or the like. When the current block does not correspond to the skip mode, which prediction mode from among the intra mode or the inter prediction mode was used to encode the current block may be signaled.

The encoder 155 may obtain a prediction block of the current block, based on the prediction mode of the current block, and then may encode residual by transforming and quantizing the residual that is a difference value between the current block and the prediction block. The encoder 155 may determine an intra prediction mode candidate to be applied to the current block, by using a width and height of the current block. The encoder 155 may encode information about an intra prediction mode of the current block. The encoder 155 determines the intra prediction mode in which a rate distortion (RD) cost is optimal, by applying intra prediction modes according to various embodiments. When the prediction mode of the current block is finally determined to be the intra prediction mode, the encoder 155 may add, to a bitstream, a plurality of pieces of information about which prediction mode among the skip mode, the inter prediction mode, and the intra prediction mode is used to predict the current block, and intra prediction mode information of the intra-predicted current block, and may transmit the bitstream to the image decoding apparatus 100.

The output unit 160 may generate a bitstream including the intra prediction mode information about the current block and structure information for determining data units having hierarchical split shapes, and may output the bitstream.

Figure 2B:
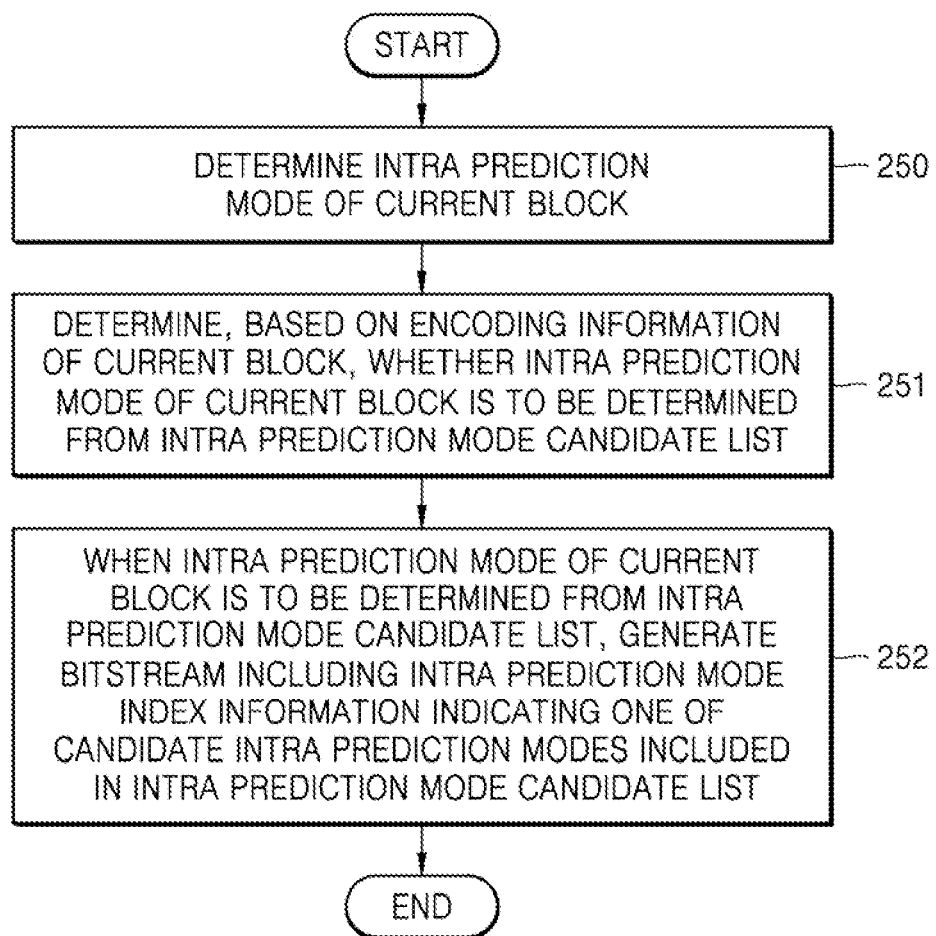
FIG. 2B illustrates a flowchart of an image encoding method according to an embodiment.

FIG. 2B illustrates a flowchart of an image encoding method according to an embodiment.

In operation 250, the encoder 155 applies intra prediction modes available for a current block, and determines an intra prediction mode having an optimal RD cost.

In operation 251, the encoder 155 determines, based on encoding information of the current block, whether an intra prediction mode of the current block is to be determined from an intra prediction mode candidate list obtained by using a plurality of pieces of prediction mode information of adjacent blocks adjacent to the current block.

In operation 252, when the intra prediction mode of the current block is to be determined from the intra prediction mode candidate list, the encoder 155 generates a bitstream including intra prediction mode index information indicating one of candidate intra prediction modes included in the intra prediction mode candidate list.

Figure 2C:
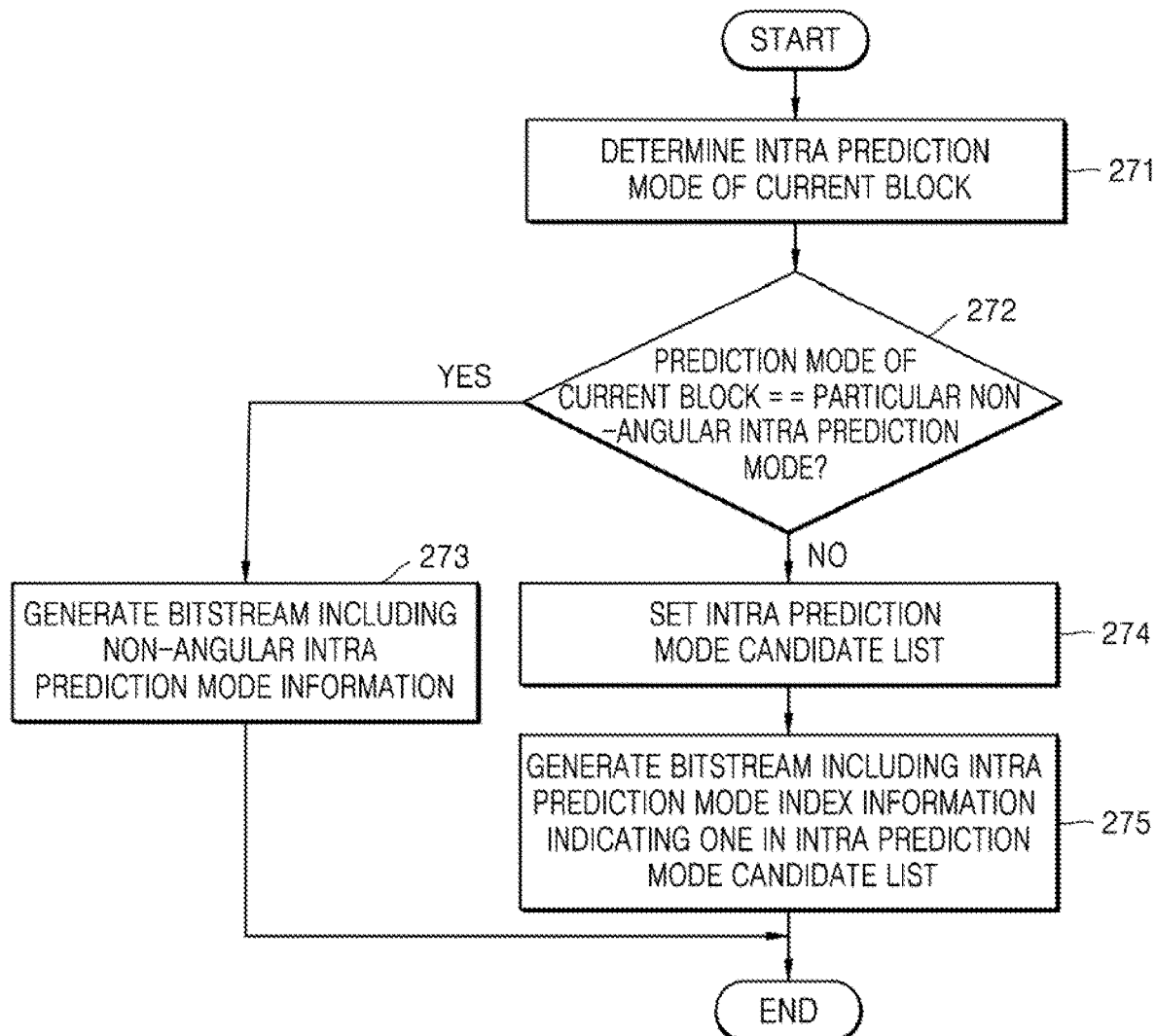
FIG. 2C illustrates a flowchart of an image encoding method according to another embodiment.

FIG. 2C illustrates a flowchart of an image encoding method according to another embodiment.

In operation 271, the encoder 155 applies intra prediction modes available for a current block, and determines an intra prediction mode having an optimal RD cost.

In operation 272, the encoder 155 determines whether an intra prediction mode of the current block is a particular non-angular intra prediction mode. As a result of the determination in operation 272, when the intra prediction mode of the current block is the particular non-angular intra prediction mode, in operation 273, the encoder 155 adds information about the particular non-angular intra prediction mode as information about the intra prediction mode of the current block to a bitstream. When the intra prediction mode of the current block is not the particular non-angular intra prediction mode, in operation 274, the encoder 155 sets an intra prediction mode candidate list (an MPM list) based on prediction mode information of an adjacent block adjacent to the current block, and in operation 275, the encoder 155 generates a bitstream including intra prediction mode index information (MPM idx) indicating one in the intra prediction mode candidate list.

Figure 2D:
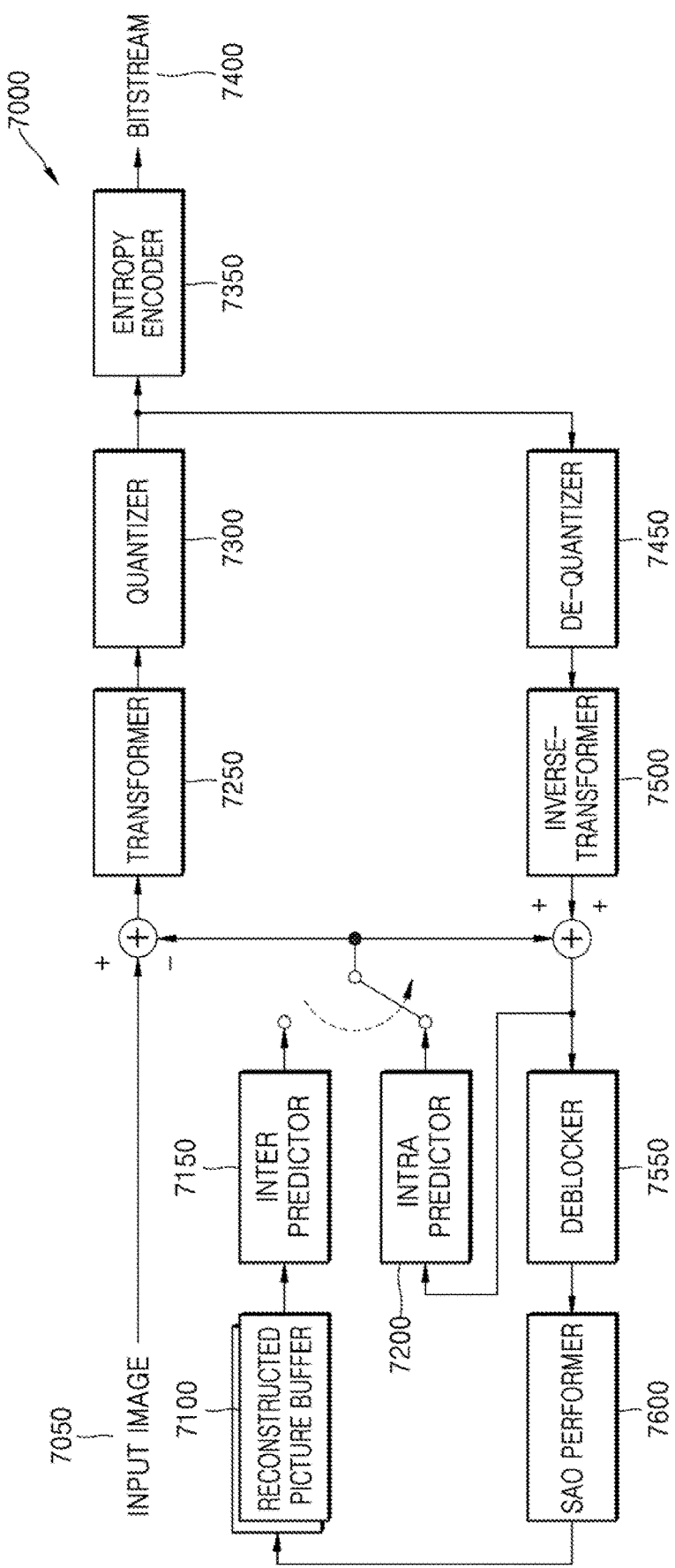
FIG. 2D is a block diagram of an image encoder according to various embodiments.

FIG. 2D is a block diagram of an image encoder according to various embodiments.

An image encoder 7000 according to various embodiments performs operations necessary for the encoder 155 of the image encoding apparatus 150 to encode image data.

That is, an intra predictor 7200 performs intra prediction on each of blocks of a current image 7050, and an inter predictor 7150 performs inter prediction on each of the blocks by using the current image 7050 and a reference image obtained from a reconstructed picture buffer 7100.

The residual data is obtained by subtracting prediction data from data of a block to be encoded in the current image 7050, wherein the prediction data is related to each block and is output from the intra predictor 7200 or the inter predictor 7150, and a transformer 7250 and a quantizer 7300 may output a quantized transform coefficient of each block by performing transformation and quantization on the residual data.

A de-quantizer 7450 and an inverse-transformer 7500 may reconstruct residual data of a spatial domain by performing inverse quantization and inverse transformation on the quantized transform coefficient. The reconstructed residual data of the spatial domain may be added to the prediction data that is related to each block and is output from the intra predictor 7200 or the inter predictor 7150, and thus may be reconstructed as data of a spatial domain with respect to a block of the current image 7050. A deblocker 7550 and a SAO performer 7600 generate a filtered reconstructed image by performing inloop filtering on the reconstructed data of the spatial domain. The generated reconstructed image is stored in the reconstructed picture buffer 7100. Reconstructed images stored in the reconstructed picture buffer 7100 may be used as a reference image for inter prediction with respect to another image. An entropy encoder 7350 may entropy encode the quantized transform coefficient, and the entropy encoded coefficient may be output as a bitstream 7400.

In order for the image encoder 7000 according to various embodiments to be applied to the image encoding apparatus 150, the image encoder 7000 according to various embodiments may perform operations of each stage on each block.

Figure 2E:
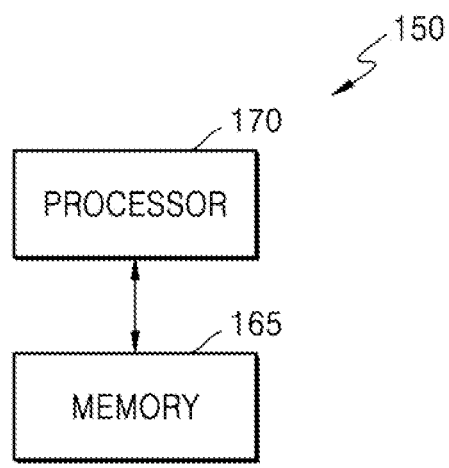
FIG. 2E is a block diagram of an image encoding apparatus according to an embodiment.

FIG. 2E is a block diagram of the image encoding apparatus 150 according to an embodiment.

The image encoding apparatus 150 according to an embodiment may include a memory 165 and at least one processor 170 connected with the memory 165. Operations of the image encoding apparatus 150 according to an embodiment may be performed by individual processors or may be performed by the control of a central processor. Also, the memory 165 of the image encoding apparatus 150 may store data received from an external source, and data generated by a processor.

The processor 170 of the image encoding apparatus 150 may apply intra prediction modes available for a current block, and determine an intra prediction mode having an optimal RD cost, may determine, based on encoding information of the current block, whether an intra prediction mode of the current block is to be determined from an intra prediction mode candidate list obtained by using a plurality of pieces of prediction mode information of adjacent blocks adjacent to the current block, and when the intra prediction mode of the current block is to be determined from the intra prediction mode candidate list, the processor 170 may generate a bitstream including intra prediction mode index information indicating one of candidate intra prediction modes included in the intra prediction mode candidate list.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) refers to an N×N block including N×N samples (where N is an integer). Each color component may be split into one or more largest coding blocks.

When a picture has three sample arrays (sample arrays for Y, Cr, and Cb components, respectively), a largest coding unit (CTU) includes a largest coding block of a luma sample, two corresponding largest coding blocks of chroma samples, and syntax elements used to encode the luma sample and the chroma samples. When a picture is a monochrome picture, a largest coding unit includes a largest coding block of a monochrome sample and syntax elements used to encode the monochrome samples. When a picture is a picture encoded in color planes separated according to color components, a largest coding unit includes syntax elements used to encode the picture and samples of the picture.

One largest coding block (CTB) may be split into M×N coding blocks including M×N samples (where M and N are integers).

When a picture has sample arrays for respective Y, Cr, and Cb components, a coding unit (CU) includes a coding block of a luma sample, two corresponding coding blocks of chroma samples, and syntax elements used to encode the luma sample and the chroma samples. When a picture is a monochrome picture, a coding unit includes a coding block of a monochrome sample and syntax elements used to encode the monochrome samples. When a picture is a picture encoded in color planes separated according to color components, a coding unit includes syntax elements used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax element corresponding to the (largest) coding block. However, because one of ordinary skill in the art can understand that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a maximum size of a luma coding block may be obtained from the bitstream. For example, the maximum size of the luma coding block indicated by the information about the maximum size of the luma coding block may be one of 16×16, 32×32, 64×64, 128×128, and 256×256.

For example, information about a luma block size difference and a maximum size of a luma coding block that is splittable by 2 may be obtained from the bitstream. The information about the luma block size difference may refer to a size difference between a luma largest coding unit and a largest luma coding block that is splittable by 2. Accordingly, when the information about the maximum size of the luma coding block that is splittable by 2 and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from the bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from the bitstream. At least one of information indicating whether quad splitting is to be performed, information indicating whether multi-splitting is to be performed, split direction information, and split type information may be obtained as the split shape mode information from the bitstream.

For example, the information indicating whether quad splitting is to be performed may indicate whether a current coding unit is to be quad split (QUAD_SPLIT) or not.

When the current coding unit is not to be quad split, the information indicating whether multi-splitting is to be performed may indicate whether the current coding unit is to not be split (NO_SPLIT) any more or is to be binary/ternary split.

When the current coding unit is binary split or ternary split, the split direction information indicates that the current coding unit is to be split in one of a horizontal direction or a vertical direction.

When the current coding unit is split in the horizontal direction or the vertical direction, the split type information indicates that the current coding unit is to be binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode SPLIT_TT_VER.

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad-split a coding unit, whether not to split a coding unit, a split direction, and a split type, based on one bin string.

The coding unit may be smaller than or equal to the largest coding unit. For example, because a largest coding unit is a coding unit having a maximum size, the largest coding unit is one of coding units. When split shape mode information about a largest coding unit indicates that splitting is not to be performed, a coding unit determined in the largest coding unit has the same size as that of the largest coding unit. When split shape code information about a largest coding unit indicates that splitting is to be performed, the largest coding unit may be split into coding units. Also, when split shape mode information about a coding unit indicates that splitting is to be performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be equal to or smaller than the coding unit. Also, one or more transform blocks for transformation may be determined from the coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and a neighboring block of the disclosure may indicate one of the largest coding unit, the coding unit, the prediction block, and the transform block. Also, the current block of the current coding unit is a block that is currently being decoded or encoded or a block that is currently being split. The neighboring block may be a block reconstructed prior to the current block. The neighboring block may be spatially or temporally adjacent to the current block. The neighboring block may be located at one of the lower-left, left, upper-left, top, upper-right, right, lower-right of the current block.

Figure 3:
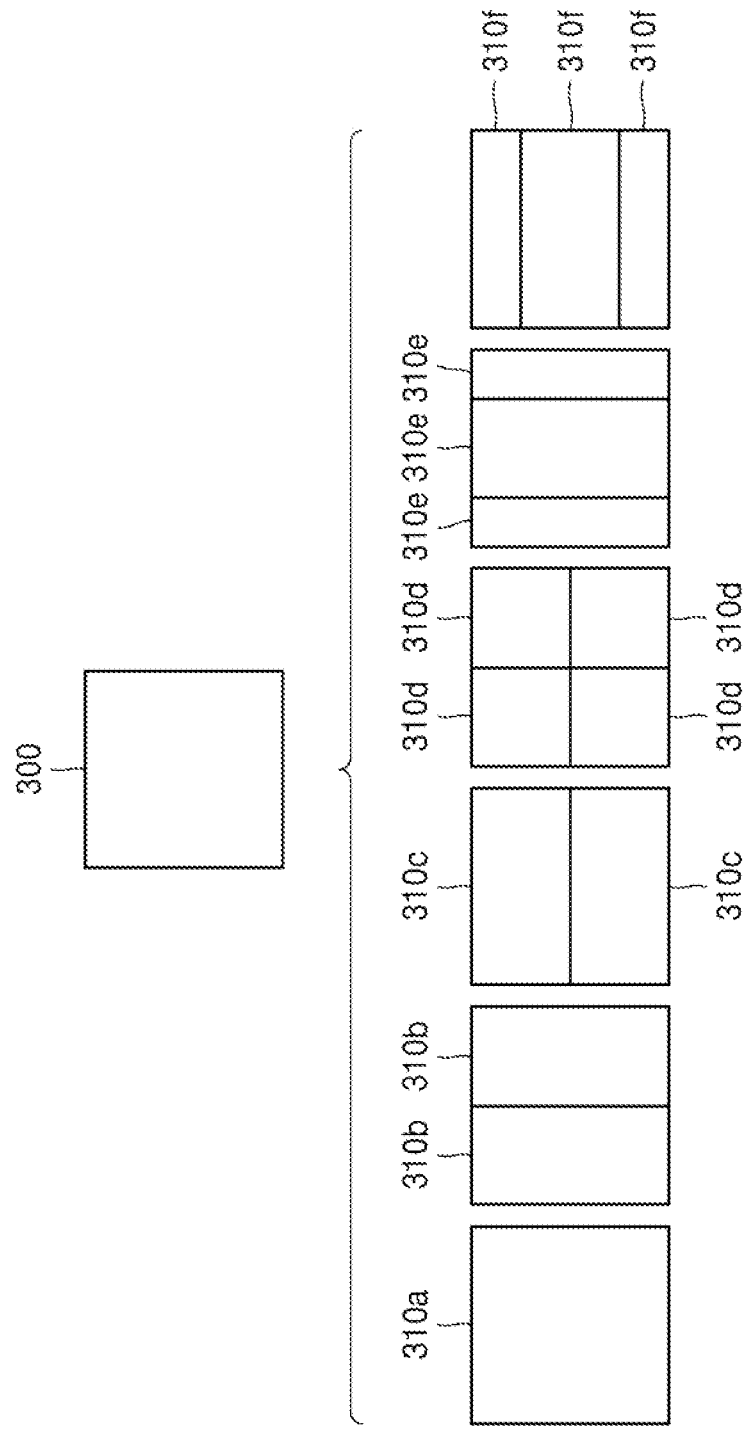
FIG. 3 illustrates a process, performed by the image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, direction, a ratio of a width and height, or sizes of the width and height.

The shape of the coding unit may include a square and a non-square. When the lengths of the width and height of the coding unit are equal (i.e., when the block shape of the coding unit is 4N×4N), the image decoding apparatus 100 may determine the block shape information of the coding unit as a square. The image decoding apparatus 100 may determine the shape of the coding unit to be a non-square.

When the lengths of the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height in the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 150 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which both the width and the height of the coding unit are bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary-splitting in a vertical direction. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the aforementioned methods, and may include various methods that may be indicated by the split shape mode information. Predetermined splitting methods of splitting the square coding unit will be described in detail below in relation to various embodiments.

Figure 4:
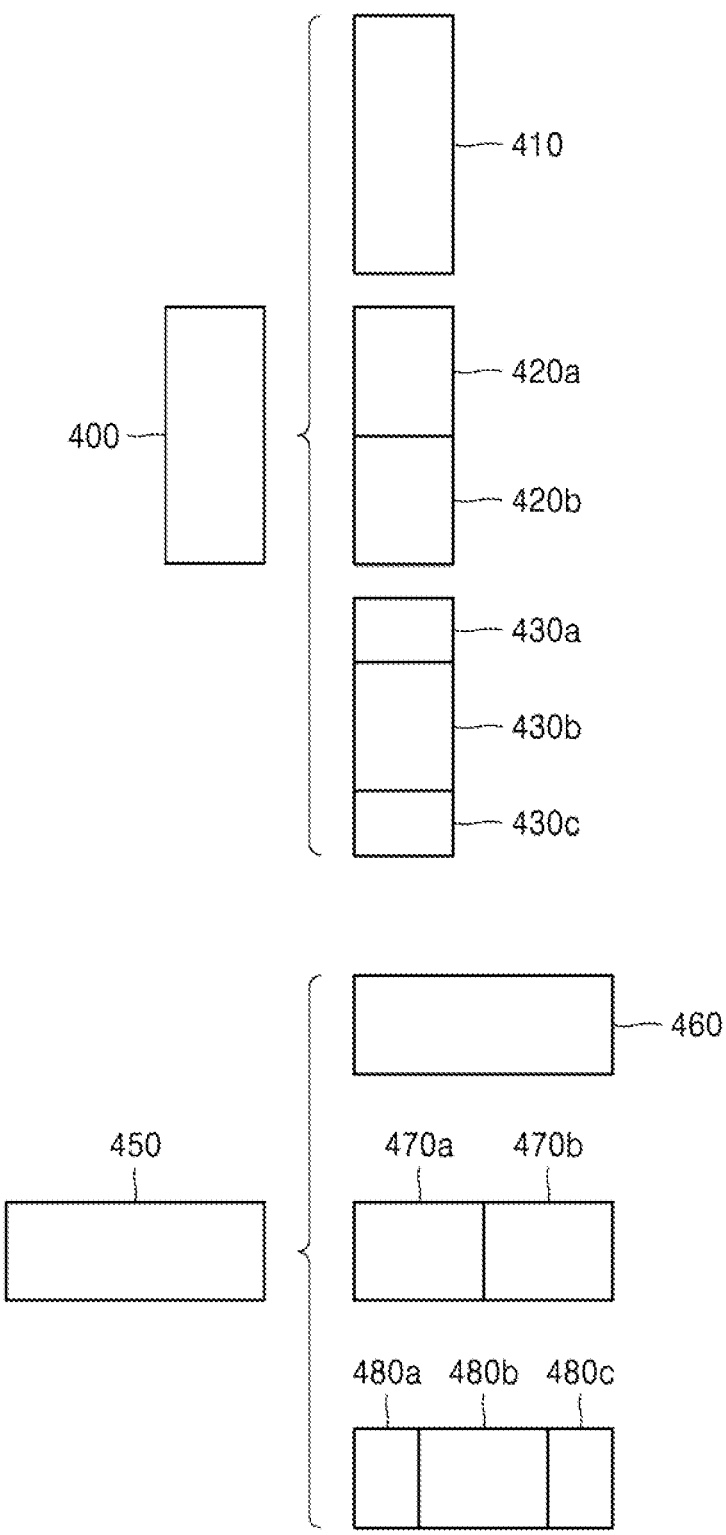
FIG. 4 illustrates a process, performed by the image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450, based on the split shape mode information indicating not to perform splitting, or may determine coding units 420a and 420b, 430a, 430b, and 430c, 470a and 470b, or 480a, 480b, and 480c which are split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may split a current coding unit, in consideration of the location of a long side of the non-square current coding unit 400 or 450. For example, the image decoding apparatus 100 may determine a plurality of coding units by splitting the current coding unit 400 or 450 by splitting a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction in which a height is greater than its width, the image decoding apparatus 100 may determine the coding units 430a, 430b, and 430c by splitting the current coding unit 400 in the horizontal direction. Also, when the current coding unit 450 is in the horizontal direction in which a width is greater than its height, the image decoding apparatus 100 may determine the coding units 480a, 480b, and 480c by splitting the current coding unit 450 in the vertical direction.

According to an embodiment, the image decoding apparatus 100 may determine the odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and in addition, may put a predetermined restriction on at least one coding unit from among the odd number of coding units generated by splitting the current coding unit 400 or 450. Referring to FIG. 4, the image decoding apparatus 100 may allow a decoding process of the coding unit 430b or 480b to be different from that of the other coding units 430a and 430c, or 480a or 480c, wherein coding unit 430b or 480b is at a center location from among the three coding units 430a, 430b, and 430c or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
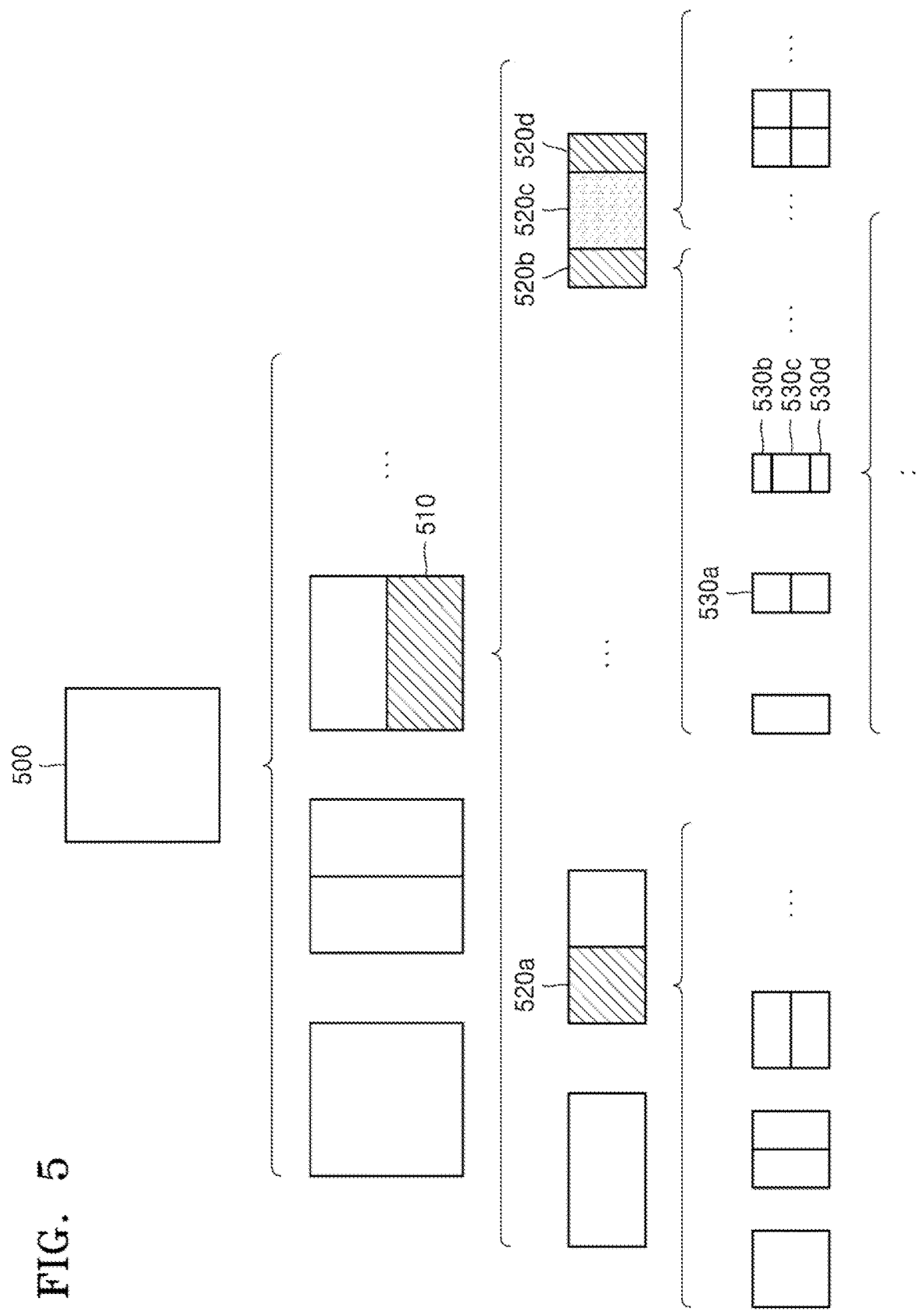
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that the structure of the first coding unit, the second coding unit, and the third coding unit follows the above descriptions.

According to an embodiment, the image decoding apparatus 100 may determine to split the determined second coding unit 510 into coding units, based on the split shape mode information, or may determine to not split the determined second coding unit 510. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not split the non-square second coding unit 510. The image decoding apparatus 100 may obtain the split shape mode information, and may determine a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit located at a center location or a square coding unit) from among the odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among a plurality of fourth coding units 530a, 530b, 530c, and 530d may be re-split into a plurality of coding units. For example, the non-square fourth coding unit 530b or 530d may be re-split into the odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the aforementioned examples, and it should be interpreted that the restrictions may include various restrictions for decoding the third coding unit 520c at the center location differently from the other third coding units 520b and 520d.

According to an embodiment, the image decoding apparatus 100 may obtain the split shape mode information, which is used to split a current coding unit, from a predetermined location in the current coding unit.

Figure 6:
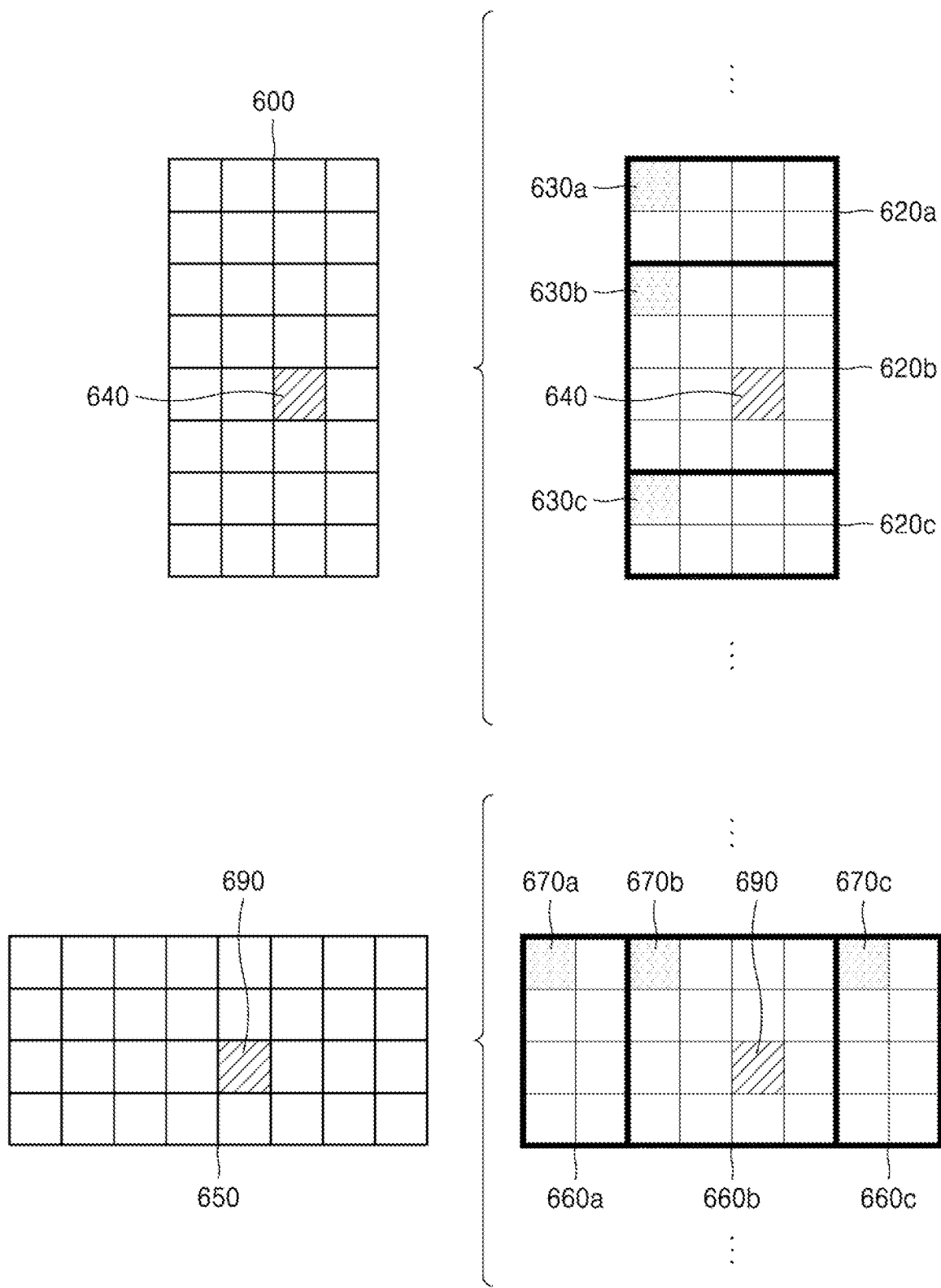
FIG. 6 illustrates a method, performed by the image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one piece of the split shape mode information may be obtained, is not limited to the center location in FIG. 6, and may include various locations included in the current coding unit 600 (e.g., top, bottom, left, right, upper-left, lower-left, upper-right, and lower-right locations). The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, so as to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top-left samples 630a, 630b, and 630c of the coding units 620a, 620b, and 620c.

According to an embodiment, the information indicating the locations of the top-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top-left sample 630a of the upper coding unit 620a may include coordinates (xa, ya), information indicating the location of the top-left sample 630b of the middle coding unit 620b may include coordinates (xb, yb), and information indicating the location of the top-left sample 630c of the lower coding unit 620c may include coordinates (xc, yc). The image decoding apparatus 100 may determine the middle coding unit 620b by using the coordinates of the top-left samples 630a, 630b, and 630c which are included in the coding units 620a, 620b, and 620c, respectively. For example, when the coordinates of the top-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top-left samples 630a, 630b, and 630c may include coordinates indicating absolute locations in the picture, or may use coordinates (dxb, dyb) indicating a relative location of the top-left sample 630b of the middle coding unit 620b and coordinates (dxc, dyc) indicating a relative location of the top-left sample 630c of the lower coding unit 620c with reference to the location of the top-left sample 630a of the upper coding unit 620a. Also, a method of determining a coding unit at a predetermined location by using coordinates of a sample included in the coding unit, as information indicating a location of the sample, should not be construed as being limited to the aforementioned method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the top-left sample 630a of the upper coding unit 620a, the coordinates (xb, yb) that is the information indicating the location of the top-left sample 630b of the middle coding unit 620b, and the coordinates (xc, yc) that is the information indicating the location of the top-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the width or height of each of the coding units 660a, 660b, and 660c by using the coordinates (xd, yd) that is information indicating the location of a top-left sample 670a of the left coding unit 660a, the coordinates (xe, ye) that is information indicating the location of a top-left sample 670b of the middle coding unit 660b, and the coordinates (xf, yf) that is information indicating a location of the top-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the predetermined location. However, the aforementioned method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the aforementioned top-left locations, and information about arbitrary locations of samples included in the coding units may be used.

According to an embodiment, the image decoding apparatus 100 may select a coding unit at a predetermined location from among an odd number of coding units determined by splitting the current coding unit, in consideration of the shape of the current coding unit. For example, when the current coding unit has a non-square shape, a width of which is longer than its height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than its width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, so as to determine the coding unit at the predetermined location from among the even number of coding units. The image decoding apparatus 100 may determine an even number of coding units by splitting (binary-splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which is described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting process to determine the coding unit at the predetermined location from among the plurality of coding units. For example, the image decoding apparatus 100 may use at least one of block shape information and split shape mode information, which is stored in a sample included in a middle coding unit, in a splitting process to determine a coding unit at a center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600), to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620*b* including a sample, from which predetermined information (e.g., the split shape mode information) is obtainable, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information is obtainable, and may put a predetermined restriction on the coding unit 620*b* including the sample 640, in a decoding operation. However, the location of the sample from which the predetermined information is obtainable is not limited to the aforementioned location, and may include arbitrary locations of samples included in the coding unit 620*b* to be determined for a restriction.

According to an embodiment, the location of the sample from which the predetermined information is obtainable may be determined based on the shape of the current coding unit 600. According to an embodiment, the block shape information may indicate whether the current coding unit has a square or non-square shape, and the location of the sample from which the predetermined information is obtainable may be determined based on the shape. For example, the image decoding apparatus 100 may determine a sample located on a boundary for splitting at least one of a width and height of the current coding unit in half, as the sample from which the predetermined information is obtainable, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the predetermined information is obtainable.

According to an embodiment, when the current coding unit is split into a plurality of coding units, the image decoding apparatus 100 may use the split shape mode information so as to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit is described above with reference to FIG. 5, and thus detailed descriptions thereof are not provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
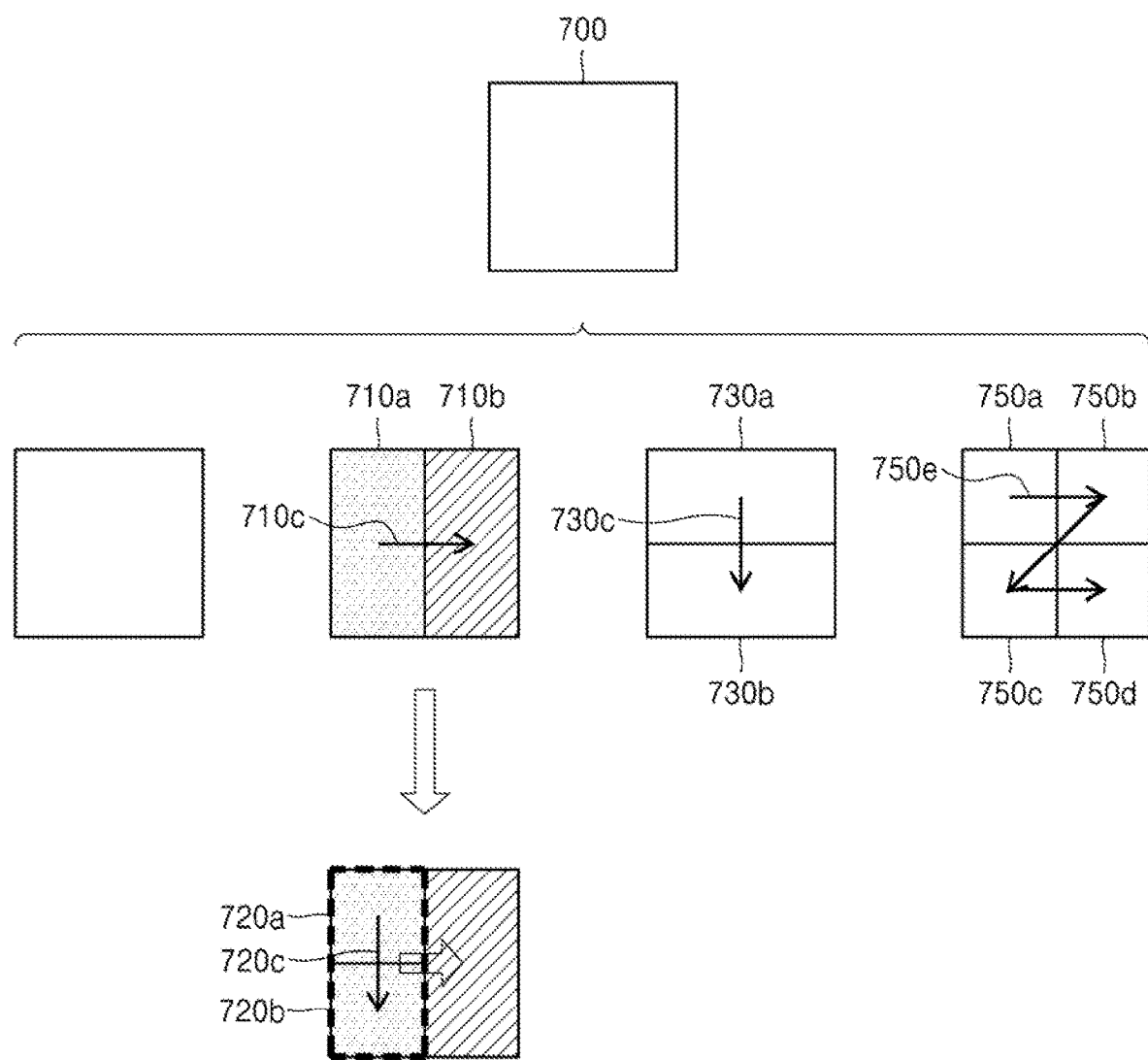
FIG. 7 illustrates an order of processing a plurality of coding units when the image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b in a horizontal direction order 710c, the second coding units 710a and 710b being determined by splitting the first coding unit 700 in a vertical direction. The image decoding apparatus 100 may determine to process the second coding units 730a and 730b in a vertical direction order 730c, the second coding units 730a and 730b being determined by splitting the first coding unit 700 in a horizontal direction. The image decoding apparatus 100 may determine the second coding units 750a, 750b, 750c, and 750d, which are determined by splitting the first coding unit 700 in vertical and horizontal directions, according to a predetermined order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a and 710b, 730a and 730b, or 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split each of the second coding units 710a and 710b or not to split the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. It should be construed that an operation of determining a processing order of coding units based on a coding unit before being split is not limited to the aforementioned example, and various methods may be used to independently process coding units, which are split and determined to various shapes, in a predetermined order.

Figure 8:
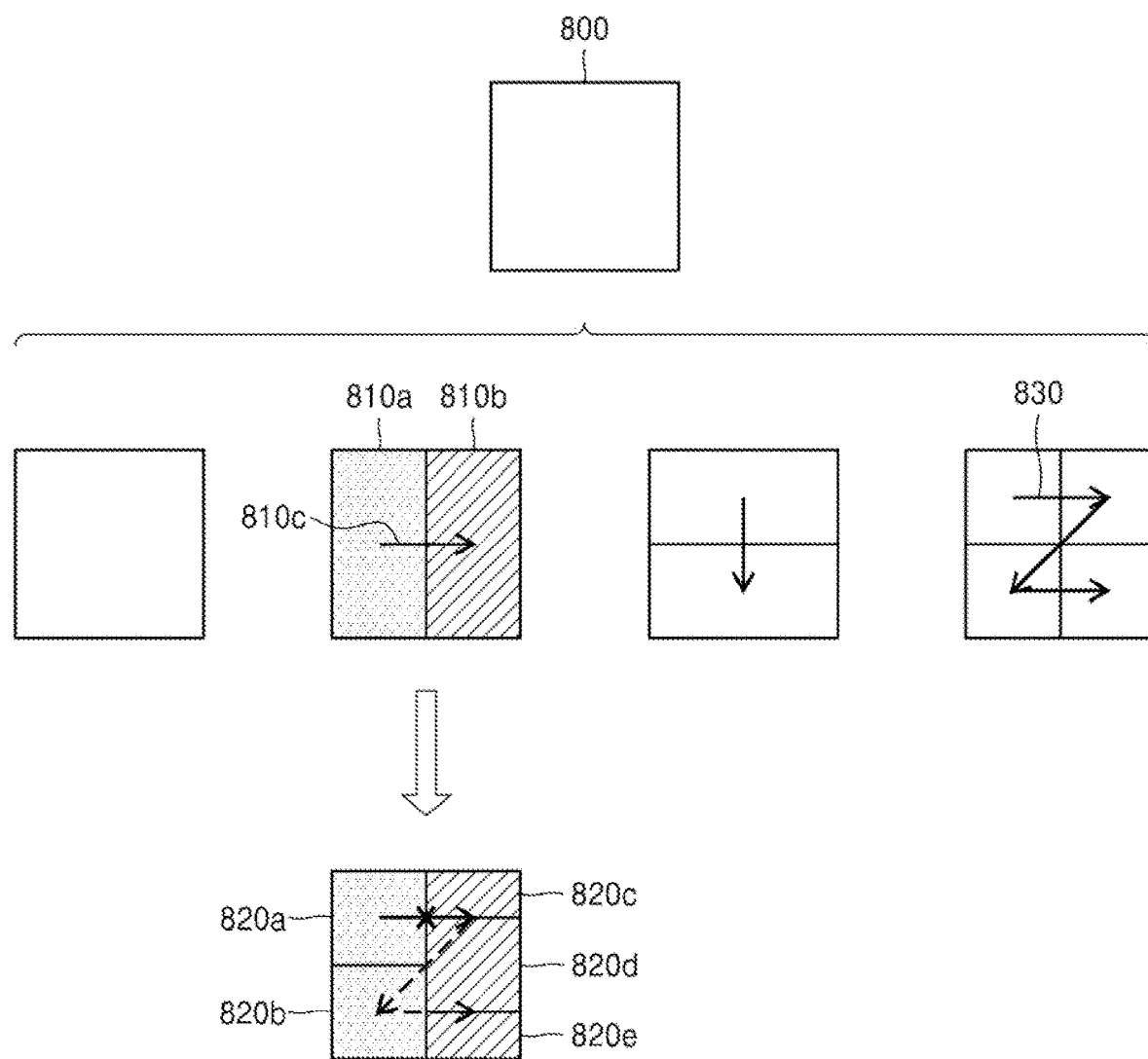
FIG. 8 illustrates a process, performed by the image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether there are an odd number of split coding units, by determining whether the third coding units 820a and 820b, and 820c, 820d, and 820e are processable in a predetermined order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e is to be split into an odd number of coding units, based on at least one of the block shape information and the split shape mode information. For example, the second coding unit 810b located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

Figure 9:
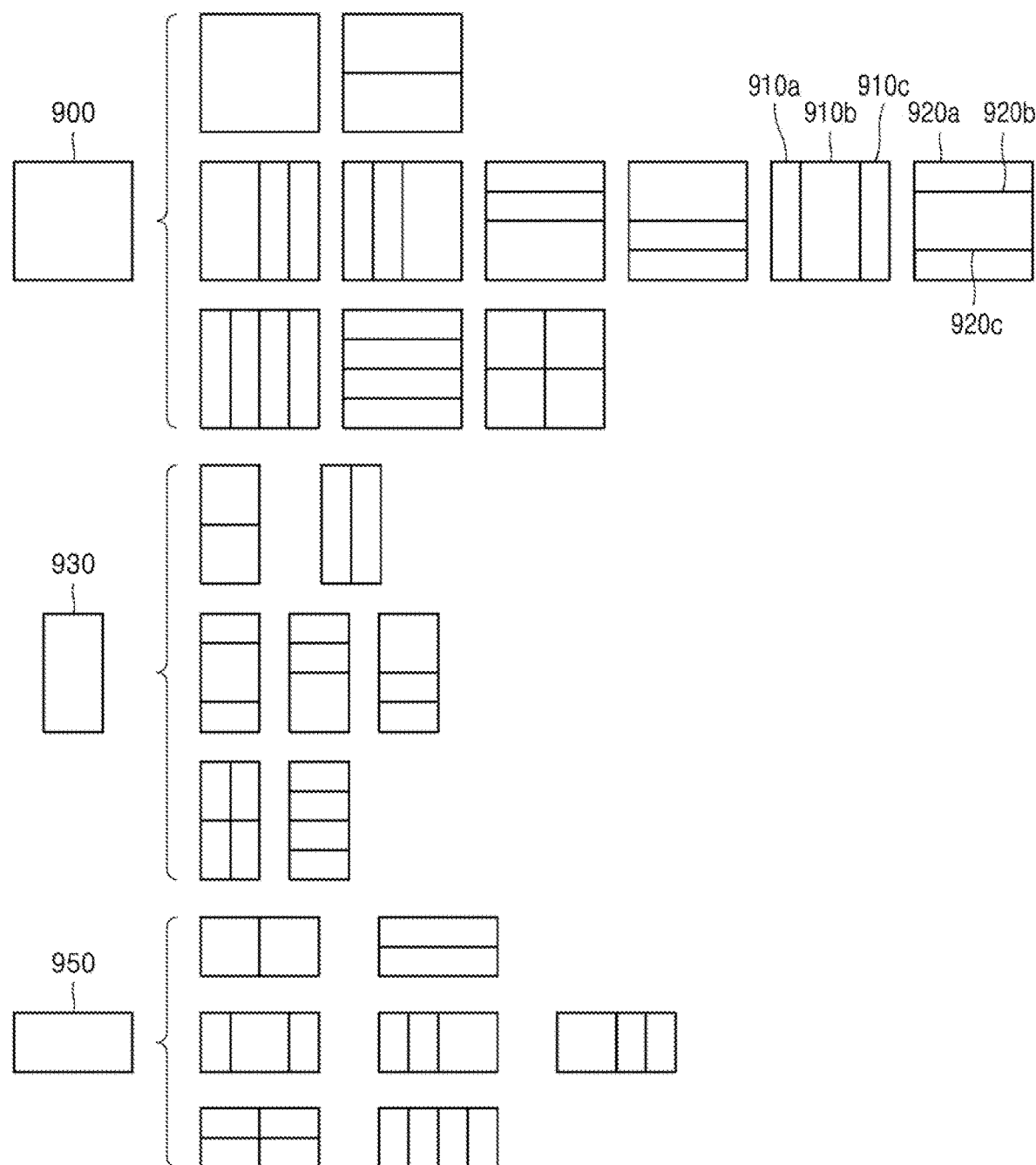
FIG. 9 illustrates a process, performed by the image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information that is obtained through a receiver (not shown). The square first coding unit 900 may be split into four square coding units, or may be split into a plurality of non-square coding units. For example, referring to FIG. 9, when the first coding unit 900 is a square and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the predetermined order. When the condition is not satisfied as described above, the image decoding apparatus 100 may determine disconnection of a scan order, and may determine that the first coding unit 900 is to be split into an odd number of coding units, based on a result of the determination. According to an embodiment, when a coding unit is split into an odd number of coding units, the image decoding apparatus 100 may put a predetermined restriction on a coding unit at a predetermined location from among the split coding units. The restriction or the predetermined location is described above in relation to various embodiments, and thus detailed descriptions thereof are not provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
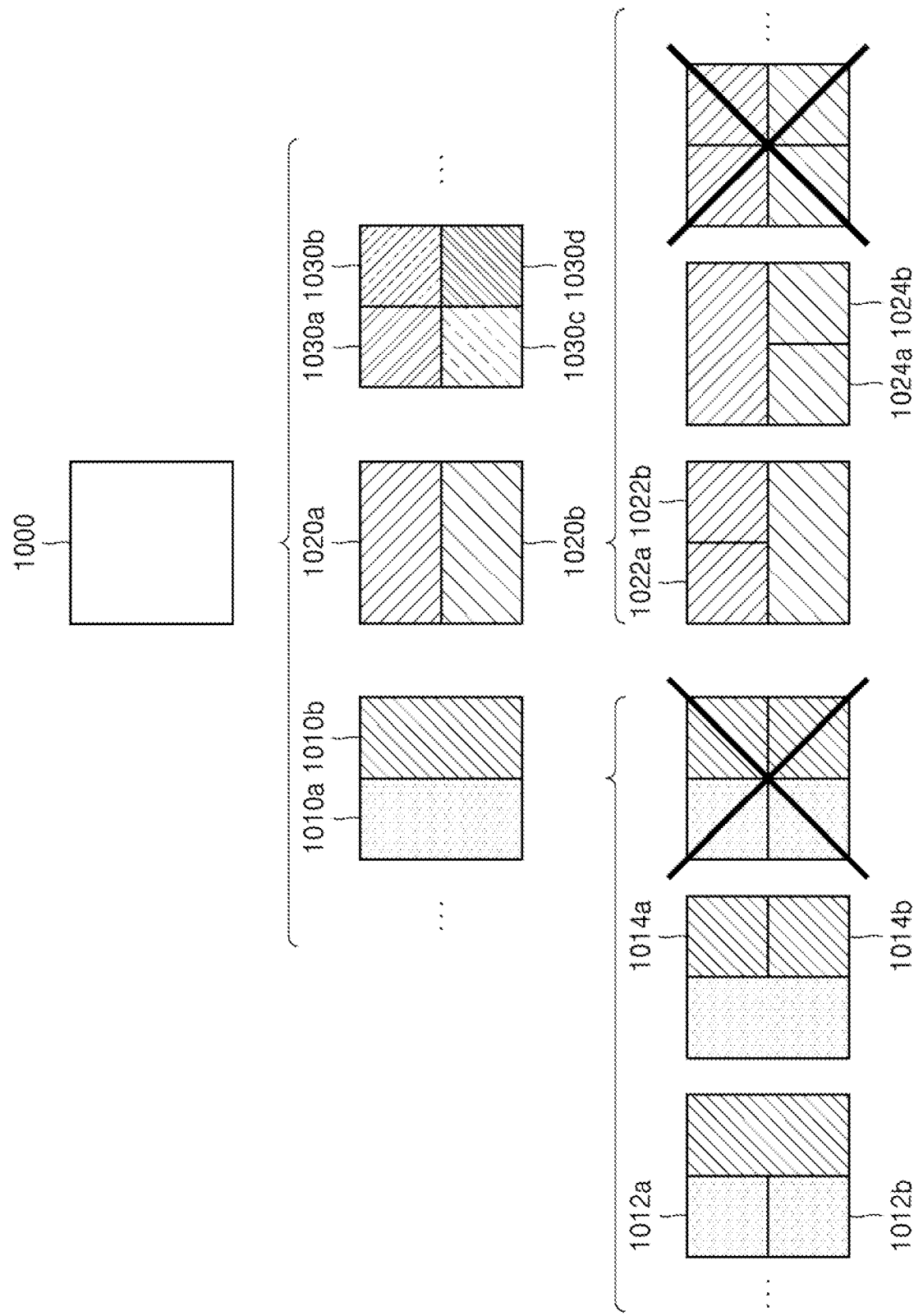
FIG. 10 illustrates that a shape into which a second coding unit is splittable is restricted when the second coding unit having a non-square shape, which is determined as the image decoding apparatus splits a first coding unit, satisfies a predetermined condition, according to an embodiment.

FIG. 10 illustrates that a shape into which a second coding unit is splittable is restricted when the second coding unit having a non-square shape, which is determined as the image decoding apparatus 100 splits a first coding unit 1000, satisfies a predetermined condition, according to an embodiment.

According to an embodiment, the image decoding apparatus 100 may determine to split the square first coding unit 1000 into non-square second coding units 1010a and 1010b or 1020a and 1020b, based on split shape mode information that is obtained by the receiver (not shown). The second coding units 1010a and 1010b or 1020a and 1020b may be independently split. Accordingly, the image decoding apparatus 100 may determine to split or not to split each of the second coding units 1010a and 1010b or 1020a and 1020b into a plurality of coding units, based on the split shape mode information of each of the second coding units 1010a and 1010b or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left second coding unit 1010a and the right second coding unit 1010b are independently split in a horizontal direction, the third coding units 1012a and 1012b or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the aforementioned reason, the image decoding apparatus 100 may restrict the other second coding unit (e.g., the lower second coding unit 1020*b*) to not be split in a vertical direction in which the upper second coding unit 1020*a* is split.

Figure 11:
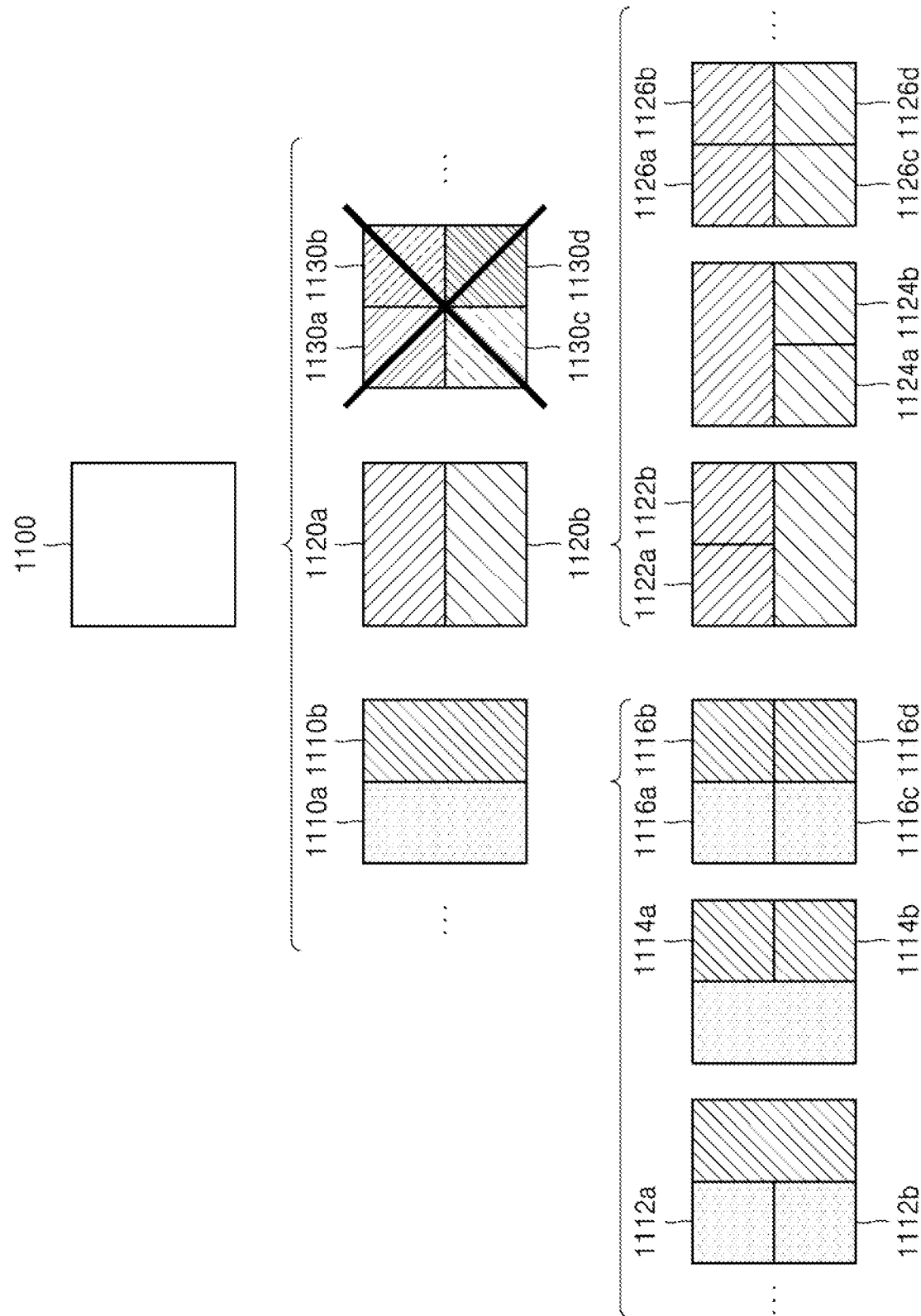
FIG. 11 illustrates a process, performed by the image decoding apparatus, of splitting a square coding unit when split shape mode information indicates that the square coding unit is to not be split into four square coding units, according to an embodiment.

FIG. 11 illustrates a process, performed by the image decoding apparatus 100, of splitting a square coding unit when split shape mode information indicates that the square coding unit is to not be split into four square coding units, according to an embodiment.

According to an embodiment, the image decoding apparatus 100 may determine second coding units 1110*a* and 1110*b* or 1120*a* and 1120*b*, etc. by splitting a first coding unit 1100, based on split shape mode information. The split shape mode information may include information about various methods of splitting a coding unit, but the information about various splitting methods may not include information for splitting a coding unit into four square coding units. Based on the split shape mode information, the image decoding apparatus 100 does not split the square first coding unit 1100 into four square second coding units 1130*a*, 1130*b*, 1130*c*, and 1130*d*. The image decoding apparatus 100 may determine the non-square second coding units 1110*a* and 1110*b* or 1120*a* and 1120*b*, etc., based on the split shape mode information.

According to an embodiment, the image decoding apparatus 100 may independently split the non-square second coding units 1110*a* and 1110*b* or 1120*a* and 1120*b*, etc. Each of the second coding units 1110*a* and 1110*b* or 1120*a* and 1120*b*, etc. may be recursively split in a predetermined order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both the left second coding unit 1110*a* and the right second coding unit 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both the upper second coding unit 1120*a* and the lower second coding unit 1120*b* in a vertical direction. In this case, coding units having the same shape as the four square second coding units 1130*a*, 1130*b*, 1130*c*, and 1130*d* split from the first coding unit 1100 may be determined.

Figure 12:
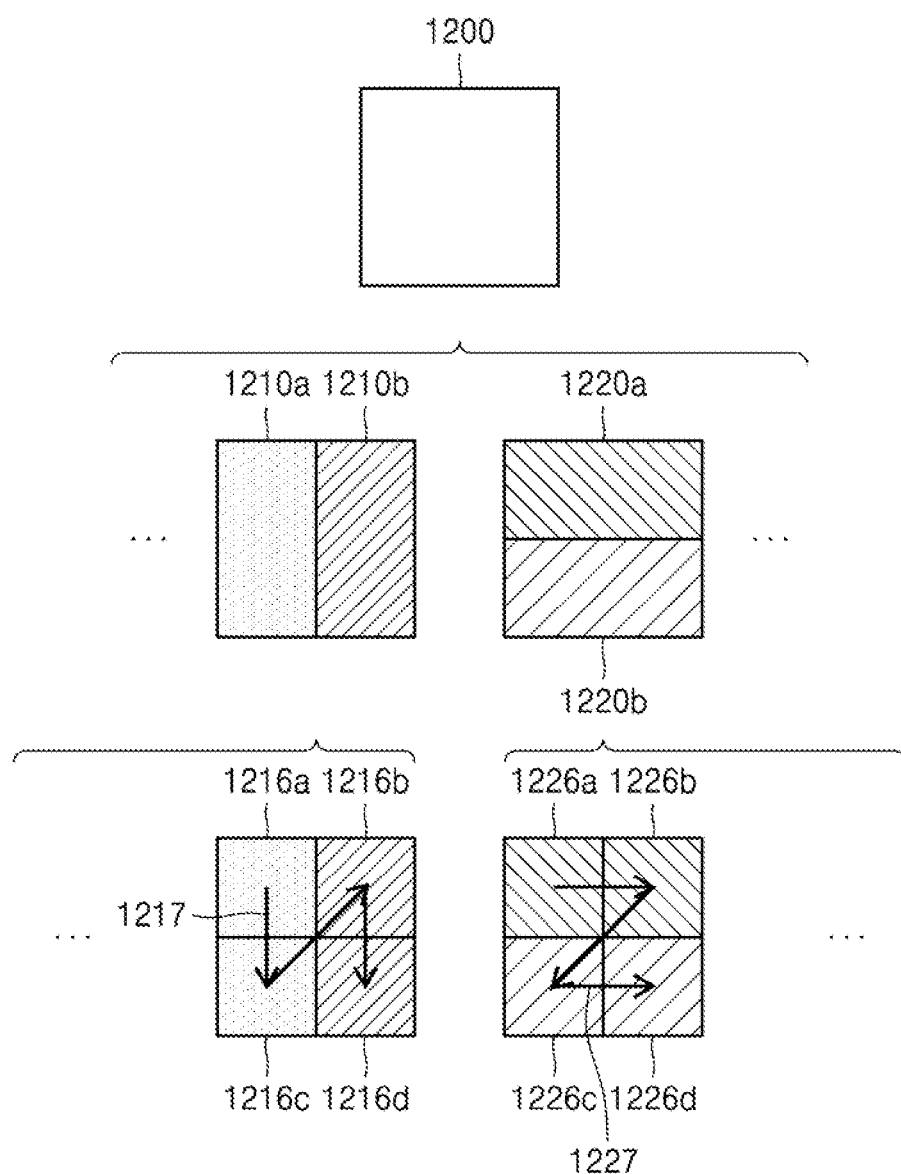
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210*a* and 1210*b* or 1220*a* and 1220*b*, etc. by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a* and 1210*b* or 1220*a* and 1220*b* is described above with reference to FIG. 11, and thus detailed descriptions thereof are not provided herein.

According to an embodiment, the image decoding apparatus 100 may process coding units in a predetermined order. An operation of processing coding units in a predetermined order is described above with reference to FIG. 7, and thus detailed descriptions thereof are not provided herein. Referring to FIG. 12, the image decoding apparatus 100 may determine four square third coding units 1216*a*, 1216*b*, 1216*c*, and 1216*d* or 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, or 1226*a*, 1226*b*, 1226*c*, and 1226*d* based on a split shape by which the first coding unit 1200 is split.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*,

1226c, and 1226d split therefrom eventually show same-shaped coding units split from the first coding unit 1200. Accordingly, by recursively splitting a coding unit in different manners based on the split shape mode information, the image decoding apparatus 100 may process a plurality of coding units in different orders even when the coding units are eventually determined to have the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than its width, or as '2: NS_HOR' indicating a non-square shape, a width of which is longer than its height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
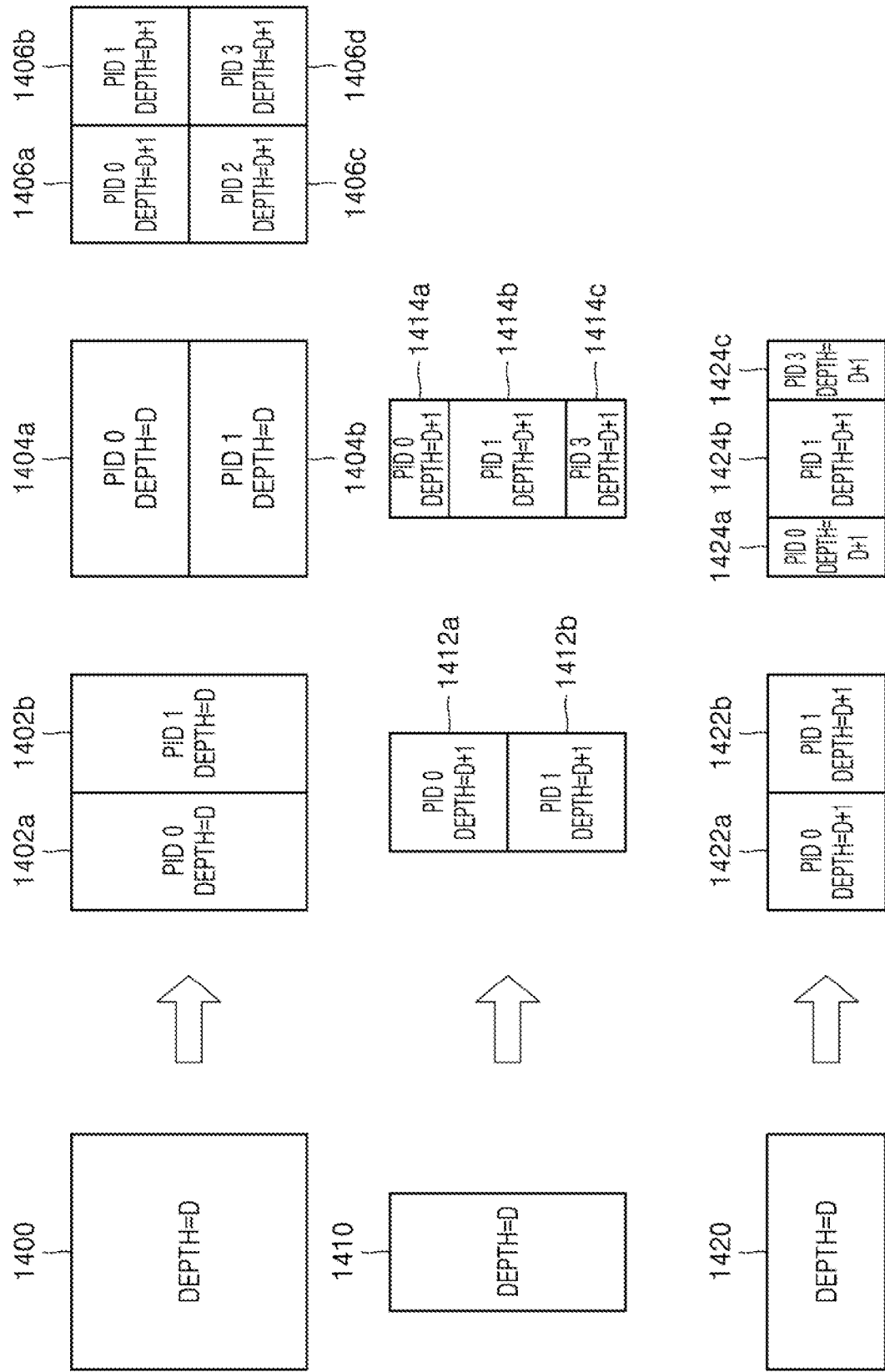
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical and horizontal directions based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than its width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than its height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than its width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than its height, by using the aforementioned method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width being equal to that of the other coding units 1414*a* and 1414*c* and a height being twice that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a particular splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than its width. The image decoding apparatus 100 may use PIDs indicating respective coding units so as to identify the respective coding units. According to an embodiment, the PID may be obtained from a sample at a predetermined location of each coding unit (e.g., an upper left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than its width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units so as to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width being equal to that of the other coding units 1414*a* and 1414*c* and a height being twice that of the other coding units

1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the aforementioned examples, and various PIDs and various locations and sizes of coding units may be used.

According to an embodiment, the image decoding apparatus 100 may use a predetermined data unit where a coding unit starts to be recursively split.

Figure 15:
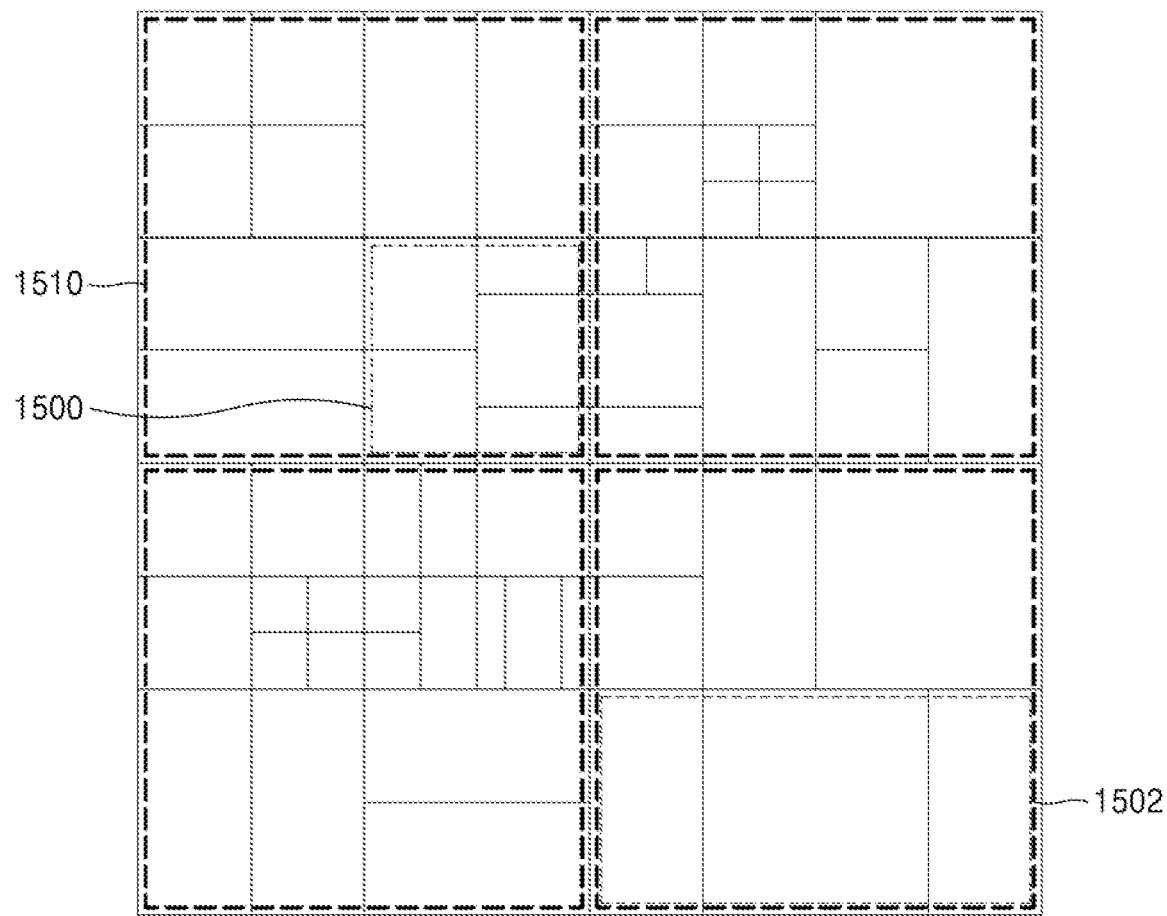
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and then may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units that may include one or more reference coding units (e.g., sequences, pictures, slices, slice segments, tiles, tile groups, largest coding units, or the like).

According to an embodiment, the receiver (not shown) of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver (not shown) may obtain, from the bitstream, only the PID for identifying the size and shape of reference coding units with respect to each slice, slice segment, tile, tile group, or largest coding unit which is a data unit satisfying a predetermined condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from an image may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
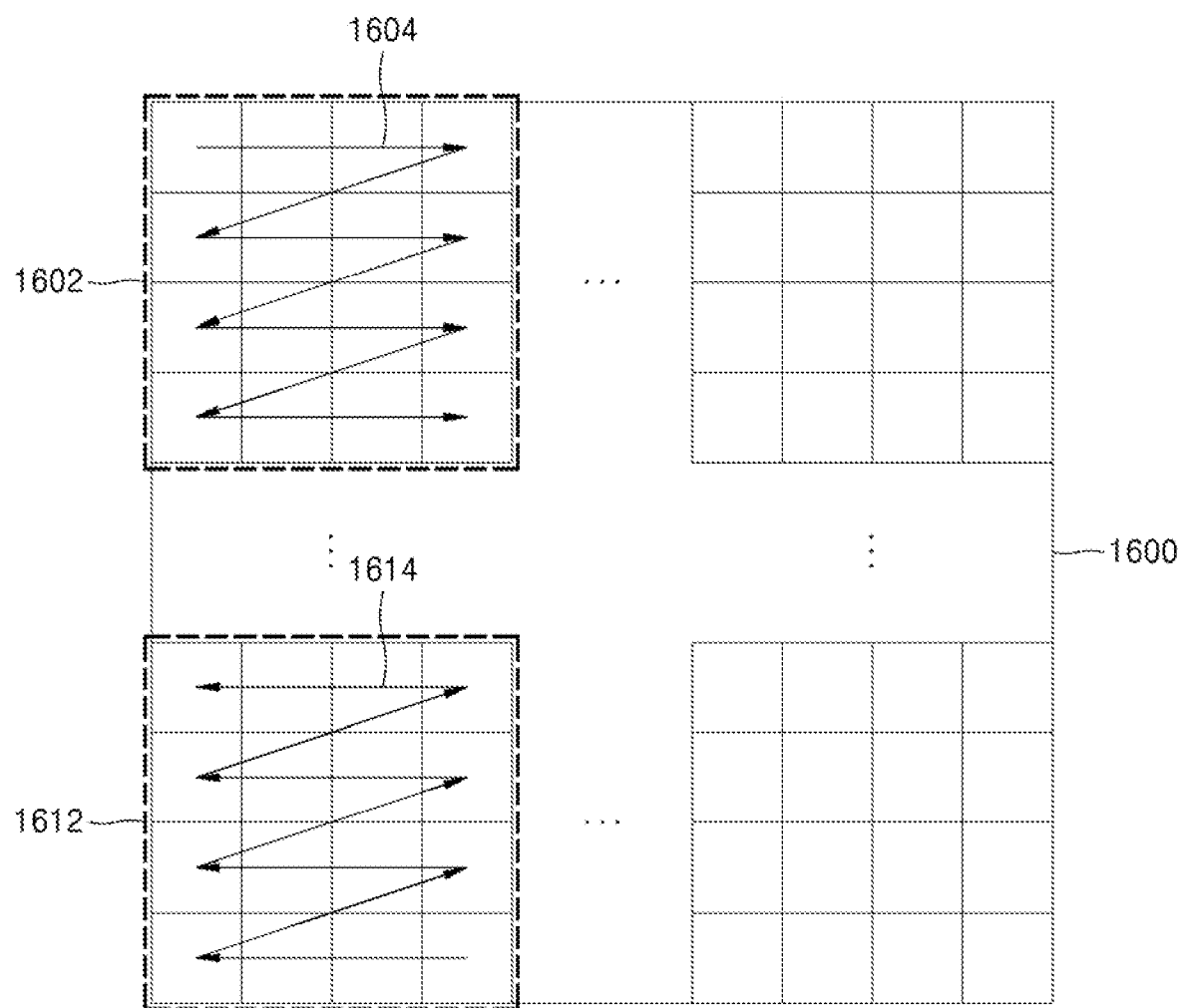
FIG. 16 illustrates a processing block serving as a criterion for determining a determination order of reference coding units included in a picture, according to an embodiment.

FIG. 16 illustrates a processing block serving as a criterion for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a particular order. That is, a determination order of one or more reference coding units determined in each of processing blocks may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the aforementioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver (not shown) of the image decoding apparatus 100 may obtain the processing block size information from the bitstream according to each particular data unit. For example, the processing block size information may be obtained from the bitstream in a data unit such as an image, sequence, picture, slice, slice segment, tile, tile group, or the like. That is, the receiver (not shown) may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each particular data unit. For example, the receiver (not shown) may obtain the determination order information of reference coding units from the bitstream according to each data unit such as an image, sequence, picture, slice, slice segment, tile, tile group, processing block, or the like. Because the determination order information of reference coding units indicates an order for determining reference coding units in a processing block, the determination order information may be obtained with respect to each particular data unit including an integer number of processing blocks.

According to an embodiment, the image decoding apparatus 100 may determine one or more reference coding units based on the determined determination order.

According to an embodiment, the receiver (not shown) may obtain the determination order information of reference coding units from the bitstream as information related to the processing blocks 1602 and 1612, and the image decoding apparatus 100 may determine a determination order of one or more reference coding units included in the processing blocks 1602 and 1612 and may determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain, from the bitstream, block shape information indicating the shape of a current coding unit or split shape mode information indicating a splitting method of the current coding unit, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 150. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 150 and the image decoding apparatus 100 may predetermine to determine the split rule based on the block shape of the coding unit. However, the disclosure is not limited thereto. The image decoding apparatus 100 may determine the split rule based on the information obtained from the bitstream received from the image encoding apparatus 150.

The shape of the coding unit may include a square and a non-square. When the lengths of the width and height of the coding unit are equal, the image decoding apparatus 100 may determine the shape of the coding unit to be a square. Also, when the lengths of the width and height of the coding unit are not equal, the image decoding apparatus 100 may determine the shape of the coding unit to be a non-square.

The size of the coding unit may include various sizes such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed, based on the size of the coding unit. The image decoding apparatus 100 may determine a split direction according to the size of the coding unit. The image decoding apparatus 100 may determine an allowable split type, based on the size of the coding unit.

The split rule determined based on the size of the coding unit may be a split rule predetermined between the image encoding apparatus 150 and the image decoding apparatus 100. Also, the image decoding apparatus 100 may determine the split rule, based on the information obtained from the bitstream.

The image decoding apparatus 100 may adaptively determine the split rule, based on a location of the coding unit. The image decoding apparatus 100 may adaptively determine the split rule, based on the location of the coding unit in the image.

Also, the image decoding apparatus 100 may determine the split rule such that coding units generated via different splitting paths do not have the same block shape. However, the disclosure is not limited thereto, and the coding units generated via different splitting paths may have the same block shape. The coding units generated via the different splitting paths may have different decoding processing orders. Because the decoding processing orders are described above with reference to FIG. 12, details thereof are not provided here.

Hereinafter, with reference to FIGS. 17 to 29, according to various embodiments provided in the present specification, a process of performing intra prediction, and encoding and decoding a determined intra prediction mode of each block will be described in detail. An intra prediction process according to various embodiments may be performed by the decoder 120 of the image decoding apparatus 100 of FIG. 1A and the encoder 155 of the image encoding apparatus 150 of FIG. 2A. In particular, the intra prediction process according to various embodiments may be performed by the intra predictor 6400 of the image decoder 6000 of FIG. 1D and the intra predictor 7200 of the image encoder 7000 of FIG. 2D.

Figure 17:
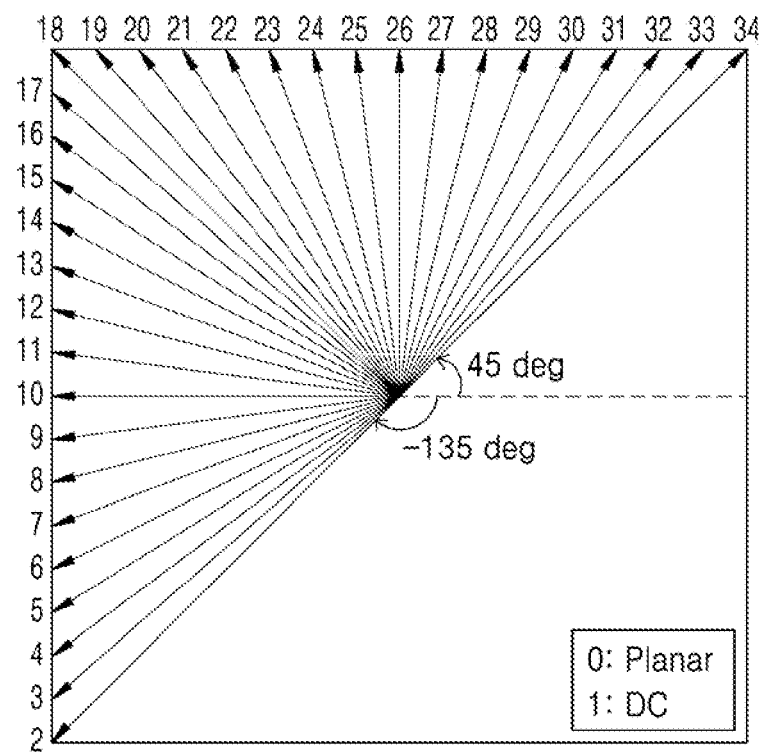
FIG. 17 illustrates intra prediction modes according to an embodiment.
Figure 18:
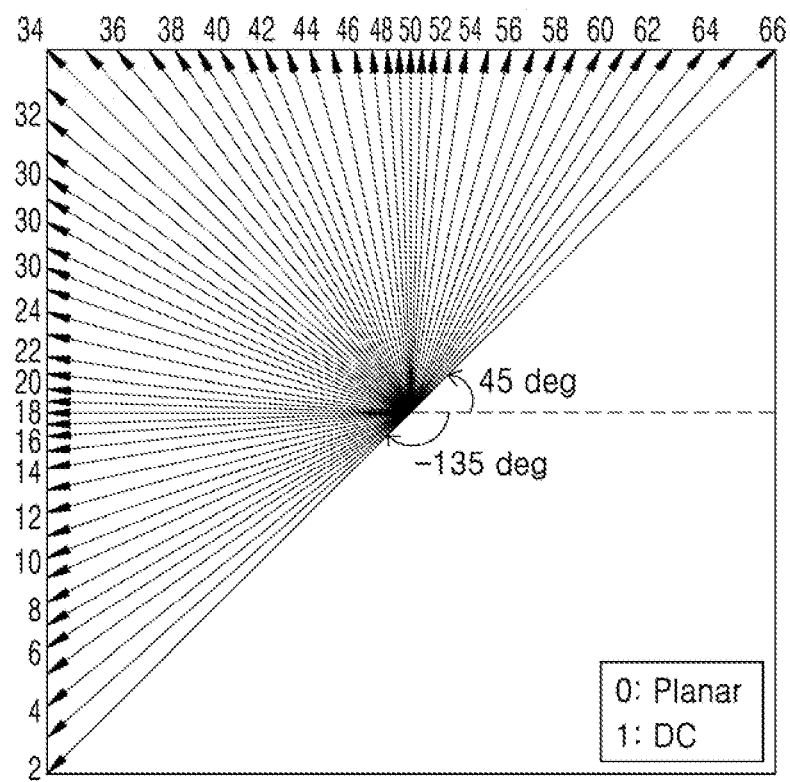
FIG. 18 illustrates intra prediction modes according to another embodiment.

FIG. 17 illustrates intra prediction modes according to an embodiment, and FIG. 18 illustrates intra prediction modes according to another embodiment.

Intra prediction modes according to various embodiments may include a non-angular intra prediction mode including a planar mode and a DC mode that do not have directivity, and an angular intra prediction mode having directivity. A non-angular mode may include a plane mode and a bi-linear mode as well as the planar mode and the DC mode.

Referring to FIGS. 17 and 18, the angular intra prediction mode includes intra prediction modes indicating particular directions within a range between −135 degrees and −180 degrees and a range between 45 degrees and 180 degrees with respect to directions of 45 degrees and −135 degrees.

In the descriptions below, angles of prediction directions in a range between 0 degree and 180 degrees which indicate directions on Quadrants I and II may be represented as +, and angles of prediction directions in a range between −180 degrees and 0 degree which indicate directions on Quadrants III and IV may be represented as −. A predetermined angle of −a (where "a" is a positive real number) indicating a direction on Quadrants III and IV corresponds to an angle of (360−a) degrees. For example, the direction of −135 degrees corresponds to the direction of 225 degrees, and the direction of −180 degrees corresponds to the direction of 180 degrees.

Prediction directions represented as arrows shown in FIGS. 17 and 18 indicate directions of adjacent pixels to be used in intra prediction, with respect to a current pixel of a current block which is to be intra predicted. Numbers marked in FIGS. 17 and 18 are examples of intra prediction mode indices according to intra prediction directions. Hereinafter, an intra prediction mode index may be referred to as predModeIntra. PredModeIntra of the planar mode and predModeIntra of the DC mode, which are the non-angular intra prediction modes, may be set as 0 and 1, respectively.

Referring to FIG. 17, angular intra prediction modes according to an embodiment may include 33 intra prediction modes obtained by dividing a gap between 45 degrees and −135 degrees by 33. The 33 angular intra prediction modes may sequentially have predModeIntra values of 2 through 34 in a clockwise direction from the direction of −135 degrees. For example, in FIG. 17, an intra prediction mode whose predModeIntra is 2 may indicate an intra prediction mode indicating a diagonal direction in the direction of −135 degrees, an intra prediction mode whose predModeIntra is 10 may indicate an intra prediction mode indicating a horizontal direction in the direction of −180 (180) degrees, an intra prediction mode whose predModeIntra is 26 may indicate an intra prediction mode indicating a vertical direction in the direction of 90 degrees, and an intra prediction mode whose predModeIntra is 34 may indicate an intra prediction mode indicating a diagonal direction in the direction of 45 degrees.

Referring to FIG. 18, angular intra prediction modes according to another embodiment may include 65 intra prediction modes obtained by dividing a gap between −135 degrees and −180 degrees and a gap between 45 degrees and 180 degrees with respect to directions of 45 degrees and −135 degrees by 65. The 65 angular intra prediction modes may sequentially have predModeIntra values of 2 through 66 in a clockwise direction from the direction of −135 degrees. For example, in FIG. 18, an intra prediction mode whose predModeIntra is 2 may indicate an intra prediction mode indicating a diagonal direction in the direction of −135 degrees, an intra prediction mode whose predModeIntra is 18 may indicate an intra prediction mode indicating a horizontal direction in the direction of −180 (180) degrees, an intra prediction mode whose predModeIntra is 50 may indicate an intra prediction mode indicating a vertical direction in the direction of 90 degrees, and an intra prediction mode whose predModeIntra is 66 may indicate an intra prediction mode indicating a diagonal direction in the direction of 45 degrees.

However, predModeIntra values of intra prediction modes are not limited to those shown in FIGS. 17 and 18 and may be changed. For example, the number of angular intra prediction modes in a clockwise direction from the direction of 45 degrees may not be limited to 33 or 65 and may be changed, predModeIntra values of the angular intra prediction modes may be sequentially set in a counterclockwise direction from the direction of 45 degrees, and the set predModeIntra values may also be changed. The angular intra prediction modes are not limited thereto and may include a predetermined number of intra prediction modes indicating particular directions in a range between random A degrees (where "A" is a real number) and B degrees (where "B" is a real number).

The intra prediction modes described with reference to FIGS. 17 and 18 are set, in consideration of a square shape. However, as described above with reference to FIGS. 3 to 5, according to an embodiment, data units including a coding unit, a prediction unit, and transform units may each have a square shape or a non-square shape. Also, according to a 4:2:2 format, even when a luma component block has a square shape, a block of a chroma component corresponding thereto may have a non-square shape. Also, according to an embodiment, a data unit to be used in intra prediction may not have a fixed size as that of a macroblock according to the related art but may have various sizes.

According to an embodiment, an intra prediction mode candidate to be used in intra prediction of a current block may be adaptively changed, in consideration of at least one of a size and a shape of the current block.

In detail, according to an embodiment, directions and the number of intra prediction modes to be applied to the current block may be adaptively set, in proportion to the size of the current block to be intra predicted. The number of intra prediction modes that are applicable to the current block may be increased, in proportion to the size of the current block. Also, according to an embodiment, blocks may be grouped according to their sizes, and the number of intra prediction modes to be applied to a group of larger blocks may be increased. For example, when the size of the current block is equal to or smaller than 8×8, a minimum a number (where a is a positive integer) of intra prediction modes may be applied, a b number (where a is a positive integer, b>a) of intra prediction modes may be applied to 16×16 and 32×32 blocks, and a c number (where a is a positive integer, c>b) of intra prediction modes may be applied to blocks equal to or greater than 64×64.

On the other hand, according to another embodiment, directions and the number of intra prediction modes to be applied to the current block may be adaptively set, in inverse proportion to the size of the current block to be intra predicted. That is, the number of intra prediction modes that are applicable to the current block may be decreased, in proportion to the size of the current block. Also, according to an embodiment, blocks may be grouped according to their sizes, and the number of intra prediction modes to be applied to a group of larger blocks may be decreased. For example, when the size of the current block is equal to or smaller than 8×8, a maximum c number of intra prediction modes may be applied, a b number of intra prediction modes may be applied to 16×16 and 32×32 blocks, and an a number of intra prediction modes may be applied to blocks equal to or greater than 64×64.

According to another embodiment, the number of intra prediction modes to be applied to blocks of all sizes may be equal, regardless of sizes of the blocks.

Also, according to another embodiment, directions and the number of intra prediction modes to be applied to the current block may be adaptively set, based on a shape of the current block or a height and width of the current block. In detail, when the current block has a square shape, as described above with reference to FIGS. 17 and 18, predetermined intra prediction modes may be used, and when the current block has a non-square shape, intra prediction modes may be set to finely indicate one of a height direction and a width direction.

Figure 19:
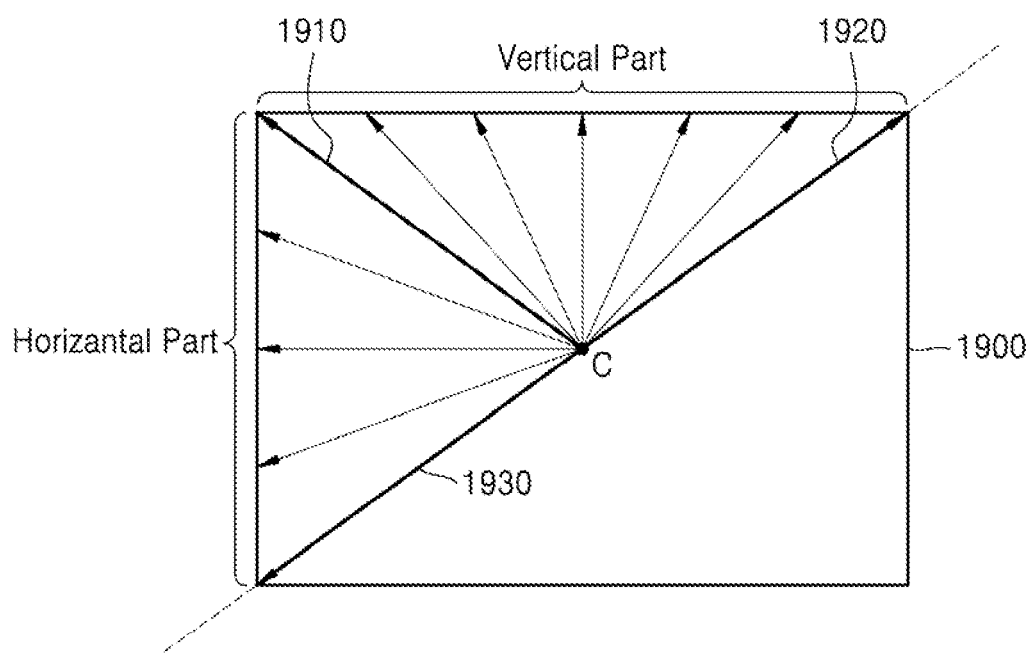
FIG. 19 is a diagram for describing intra prediction modes to be applied to a non-square shape, according to various embodiments.

FIG. 19 is a diagram for describing intra prediction modes to be applied to a non-square shape, according to various embodiments.

Referring to FIG. 19, intra prediction modes to be applied to a non-square shape block 1900 include vertical-part intra prediction modes configured by dividing angles between a direction indicated by a first intra prediction mode 1910 and a direction indicated by a second intra prediction mode 1920, and horizontal-part intra prediction modes configured by dividing angles between the direction indicated by the first intra prediction mode 1910 and a direction indicated by a third intra prediction mode 1930, based on the first intra prediction mode 1910 in a direction indicating a top-left vertex from a block center C, the second intra prediction mode 1920 in a direction indicating a top-right vertex from the block center C, and the third intra prediction mode 1930 in a direction indicating a bottom-left vertex from the block center C. The number of the horizontal-part intra prediction modes and the number of the vertical-part intra prediction modes may be set based on a width and a height of the block 1900. For a block having a non-square shape, the number of intra prediction modes indicating a side of a greater length may be set to be greater than the number of intra prediction modes indicating a side of a smaller length. For example, as illustrated in FIG. 19, for the non-square shape block 1900 whose width is greater than its height, the number of the vertical-part intra prediction modes may be set to be greater than the number of the horizontal-part intra prediction modes.

When determining the number of the vertical-part intra prediction modes, the first intra prediction mode 1910 and the second intra prediction mode 1920 may be included in or excluded from the vertical-part intra prediction modes. Equally, when determining the number of the horizontal-part intra prediction modes, the first intra prediction mode 1910 and the third intra prediction mode 1930 may be included in or excluded from the horizontal-part intra prediction modes. For example, for a 32×16 block whose width is 32 and height is 16, it is assumed that the number of vertical-part intra prediction modes in a width direction is 16, and the number of horizontal-part intra prediction modes in a height direction is 8. In this case, a total of 25 intra prediction modes including 16 vertical-part intra prediction modes between the first intra prediction mode 1910 and the second intra prediction mode 1920 and 8 horizontal-part intra prediction modes between the second intra prediction mode 1920 and the third intra prediction mode 1930, in addition to the first intra prediction mode 1910, may be determined as intra prediction modes to be applied to the current block 1900. Alternatively, a total of 27 intra prediction modes including 16 vertical-part intra prediction modes and 8 horizontal-part intra prediction modes, in addition to the first intra prediction mode 1910, the second intra prediction mode 1920, and the third intra prediction mode 1930, may be determined as intra prediction modes to be applied to the current block 1900. A particular number of intra prediction modes may vary.

On the other hand, for a block having a non-square shape, the number of intra prediction modes indicating a side of a greater length may be set to be smaller than the number of intra prediction modes indicating a side of a smaller length. For example, in a manner opposite to the descriptions above, in FIG. 19, the number of the horizontal-part intra prediction modes may be set to be greater than the number of the vertical-part intra prediction modes.

According to various embodiments, a horizontal intra prediction mode in the direction of 180 degrees and a vertical intra prediction mode in the direction of 90 degrees are generally determined to be intra prediction modes, such that intra prediction modes may be set to densely indicate a horizontal direction in the direction of 180 degrees or a vertical direction in the direction of 90 degrees.

Hereinafter, a process of encoding and decoding information about an intra prediction mode according to various embodiments will now be described.

The encoder 155 of the image encoding apparatus 150 of FIG. 2A and the intra predictor 7200 of the image encoder 7000 of FIG. 2D determine an intra prediction mode in which a RD cost is optimal, by applying intra prediction modes according to various embodiments. When a prediction mode of the current block is finally determined to be the intra prediction mode, a plurality of pieces of information about which prediction mode among a skip mode, an inter prediction mode, and an intra prediction mode is used to predict the current block, and intra prediction mode information of the intra-predicted current block are included in a bitstream and then are transmitted to the image decoding apparatus 100. The decoder 120 of the image decoding apparatus 100 of FIG. 1A and the intra predictor 6400 of the image decoder 6000 of FIG. 1D may determine the intra prediction mode of the current block by using the information about the intra prediction mode of the current block, the information being included in the bitstream.

As described above, a total of 35 or 67 intra prediction modes including two non-angular modes of a DC mode and a planar mode, and 33 or 65 angular prediction modes may be used. As the number of intra prediction modes is increased, an amount of information to indicate an intra prediction mode of a current block may be increased. In general, when an image is processed by being split into blocks, a current block and its adjacent block have a high probability of a similar image characteristic. Therefore, there is a high probability that an intra prediction mode of an intra-predicted current block is equal to or similar to an intra prediction mode of an adjacent block. According to various embodiments, based on the fact that adjacent blocks have a high probability of a similar characteristic therebetween, an intra prediction mode candidate list including candidate intra prediction modes may be obtained by using prediction mode information of an adjacent block of a current block, the candidate intra prediction modes having a high probability to be an intra prediction mode of the current block. Hereinafter, the intra prediction mode candidate list obtained by using the prediction mode information of the adjacent block may be referred to as a Most Probable Mode (MPM) list.

When the intra prediction mode of the current block is one in the MPM list, an amount of bits required to signal the intra prediction mode of the current block may be decreased. For example, when the number of all intra prediction modes is 67, at least 7 bits are required to signal one of 67 intra prediction modes. However, when 5 or 6 MPM lists are used, there is a high probability that the intra prediction mode of the current block is determined to be one in the MPM lists, and even when the intra prediction mode of the current block is not included in the MPM lists, the rest of intra prediction modes may be signaled by using only 6 bits except for 5 or 6 MPM lists. Therefore, when an MPM list is used, an amount of all bits required to signal an intra prediction mode of an intra-predicted block from among blocks constituting a picture may be decreased.

Figure 20:
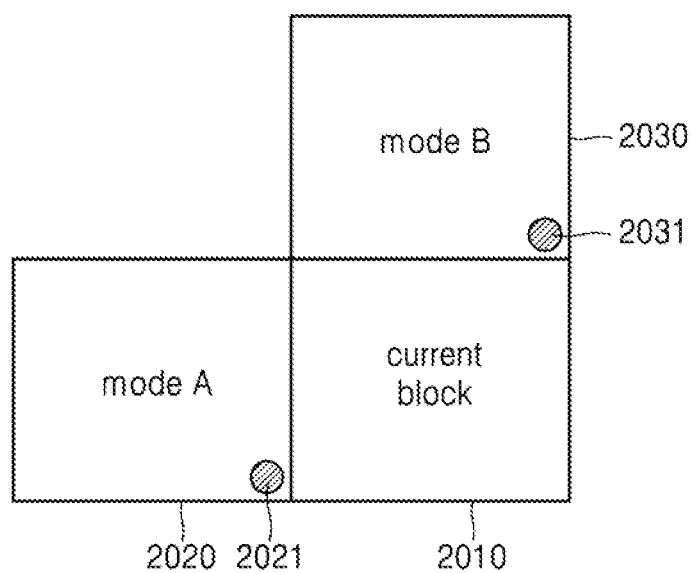
FIG. 20 is a reference diagram for describing a process of obtaining a Most Probable Mode (MPM) list by using prediction mode information of an adjacent block, according to various embodiments.

FIG. 20 is a reference diagram for describing a process of obtaining an MPM list by using prediction mode information of an adjacent block, according to various embodiments.

Referring to FIG. 20, an MPM list may be obtained by using a prediction mode A of a left adjacent block 2020 and a prediction mode B of an upper adjacent block 2030 which are processed before a current block 2010. The left adjacent block 2020 may be a block including a pixel 2021 located in the left of a bottom-left pixel located at a bottom-left vertex of the current block 2010. It is assumed that a location of a top-left pixel of a current block corresponds to (0,0), a x-coordinate value is increased in a right direction, and a y-coordinate value is increased in a downward direction, and a size of the current block 2010 is width×height. In this case, a location of a pixel at a bottom-right vertex of the current block 2010 corresponds to (width−1, height−1). When a location of the bottom-left pixel located at the bottom-left vertex of the current block 2010 corresponds to (0, height−1), a block including a pixel 2021 at a location of (−1, height−1) may be determined to be the left adjacent block 2020. The upper adjacent block 2030 is a block including a pixel 2031 located above a top-right pixel located at a top-right vertex of the current block 2010. When a location of the top-right pixel located at the top-right vertex of the current block 2010 corresponds to (width−1, 0), a block including a pixel at a location of (width−1, −1) may be determined as the upper adjacent block 2030. Hereinafter, it is assumed that 67 intra prediction modes including two non-angular intra prediction modes (planar and DC) and 65 angular intra prediction modes as shown in FIG. 18 are used, and predmodeIntra of a planar mode is 0, predModeIntra of a DC mode is 1, and predModeIntra of 2 to 66 are set in a clockwise direction to the angular intra prediction modes. As described above, predModeIntra of an intra prediction mode indicating a horizontal direction (H) may be set to 18, and predModeIntra of an intra prediction mode indicating a vertical direction (V) may be set to 50. Also, it is assumed that 6 intra prediction mode candidates are included in the MPM list.

According to an embodiment, first, availability of the left adjacent block 2020 and the upper adjacent block 2030 is checked. When it is determined that an adjacent block or an inter-predicted adjacent block included in a tile or slice different from the current block 2010 is not available, an intra prediction mode of the adjacent block determined to be not available is set to be a planar mode whose predModeIntra is 0, as a default. When an adjacent block is included in a same tile or slice as the current block 2010 and is intra predicted, an intra prediction mode of the adjacent block is changelessly set to be an intra prediction mode of the adjacent block. When intra prediction modes of the left adjacent block 2020 and the upper adjacent block 2030 are all non-angular intra prediction modes, i.e., a planar mode or a DC mode, the MPM list may include {planar, DC, H, V, V+4, V−4} or may include {planar, DC, H, V, H+4, H−4}. H denotes a horizontal intra prediction mode, and V denotes a vertical intra prediction mode. For example, in a case where an intra prediction mode of the left adjacent block 2020 is a DC intra prediction mode (predModeIntra=1), and the upper adjacent block 2030 is a planar mode (predModeInta=0), the MPM list may include {0, 1, 50, 18, 46, 54} or {0, 1, 50, 18, 14, 22}.

In a case where one of the intra prediction modes of the left adjacent block 2020 and the upper adjacent block 2030 is a non-angular intra prediction mode and the other one is an angular intra prediction mode, a greater intra prediction mode index from among intra prediction mode indices A and B of the left adjacent block 2020 and the upper adjacent block 2030 is set as maxAB. That is, when it is assumed that predModeIntra of the intra prediction mode of the left adjacent block 2020 is A and predModeIntra of the intra prediction mode of the upper adjacent block 2030 is B, maxAB=Max(A, B). In this case, the MPM list may include {planar, maxAB, DC, maxAB−1, maxAB+1, maxAB−2}. For example, in a case where the intra prediction mode of the left adjacent block 2020 has an intra prediction mode index of 60 (predModeIntra=60), and the upper adjacent block 2030 is a DC mode (predModeInta=1), maxAB=Max(60, 1)=60, and the MPM list includes {0, 60, 1, 59, 61, 58}.

When the intra prediction modes of the left adjacent block 2020 and the upper adjacent block 2030 are all angular intra prediction modes and are not same intra prediction modes, the MPM list may be set based on an angular difference between the intra prediction modes of the left adjacent block 2020 and the upper adjacent block 2030. When a value of a difference (OK?) between predModeIntra (A) of the left adjacent block 2020 and predModeIntra (B) of the upper adjacent block 2030 is within a predetermined range, e.g., between 2 and 62, the MPM list may include {planar, A, B, DC, maxAB−1, maxAB+1}. For example, in a case where the intra prediction mode of the left adjacent block 2020 has predModeIntra of 60, and the upper adjacent block 2030 has predModeIntra of 50, a value of a difference between predModeIntra (A) of the left adjacent block 2020 and predModeIntra (B) of the upper adjacent block 2030 is included in a range of 2 to 60, and thus, the MPM list includes {0, 60, 50, 1, 59, 61}.

In a case where a value of a difference between predModeIntra (A) of the left adjacent block 2020 and predModeIntra (B) of the upper adjacent block 2030 is smaller than 2 or greater than 62, the MPM list may include {planar, A, B, DC, maxAB−2, maxAB+2}. For example, in a case where the intra prediction mode of the left adjacent block 2020 has predModeIntra of 3, and the upper adjacent block 2030 has predModeIntra of 4, the MPM list includes {0, 3, 4, 1, 2, 6}.

When the intra prediction modes of the left adjacent block 2020 and the upper adjacent block 2030 are all angular intra prediction modes and same intra prediction modes, the MPM list may include {planar, A, A−1, A+1, DC mode, A−2} or {planar, B, B−1, B+1, DC mode, B−2}. For example, when all the intra prediction modes of the left adjacent block 2020 and the upper adjacent block 2030 have predModeIntra of 60, the MPM list may include {0, 60, 59, 61, 1, 58}.

Various tools including multi-reference line extension in which, as a reference sample of a current block, not only adjacent samples adjacent to the current block but also adjacent samples distant from the current block by a predetermined distance are selectively used, intra sub-partitioning in which a block to be intra predicted is split into sub-partitions, a hybrid prediction method where inter prediction and intra prediction are combined, or the like may be used in a process of encoding/decoding the current block. In order to decrease complexity, an MPM list may be selectively set according to a tool used in an encoding process of the current block. For example, when the multi-reference line extension is used in the encoding process of the current block, a planar mode and a DC mode may be excluded from the MPM list, and when the intra sub-partitioning is used, the DC mode may be excluded from the MPM list. For a block for which neither the multi-reference line extension nor the intra sub-partitioning is used, the planar mode and the DC mode are included in the MPM list, such that complexity of when the MPM list is set may be decreased. However, when a MPM list generation scheme is changed according to whether or not a particular tool is used, a possibility that an intra prediction mode biased toward the particular tool is to be selected may be increased.

According to an embodiment, a MPM list may be selectively used based on encoding information of an intra-predicted current block. In other words, according to an embodiment, it is not the case that a MPM list is used for all intra-predicted current block or an intra prediction mode of a current block is determined from candidate intra prediction modes included in a MPM list. Only when encoding information of a current block satisfies a particular condition, a MPM list may be used or an intra prediction mode of the current block may be determined from candidate intra prediction modes included in a MPM list.

According to an embodiment, when encoding information related to an intra-predicted block satisfies a predetermined condition, a MPM list may be generated without separate flag information. When the encoding information related to the intra-predicted block does not satisfy the predetermined condition, separate flag information related to whether to generate the MPM list for the intra-predicted block may be signaled. Also, according to an embodiment, before a MPM list is generated, whether an intra prediction mode of a current block is a particular intra prediction mode (e.g., a non-angular mode) may be first determined, and then, when the intra prediction mode of the current block is not the particular intra prediction mode, the MPM list may be generated, and an intra prediction mode of the current block may be determined by using a MPM index (MPM idx) indicating one of candidate intra prediction modes included in the MPM list. Also, whether to apply an encoding tool to be used for a current block may be determined from intra prediction mode candidates included in a MPM list. According to another embodiment, a MPM list of a current block may be equally generated, regardless of encoding information related to the current block. The encoding information may include information about whether to apply a predetermined encoding tool applied to the current block, reference sample information to be used in intra prediction with respect to the current block, and sub-partition information indicating whether the current block is to be split into sub-partitions.

Figure 21:
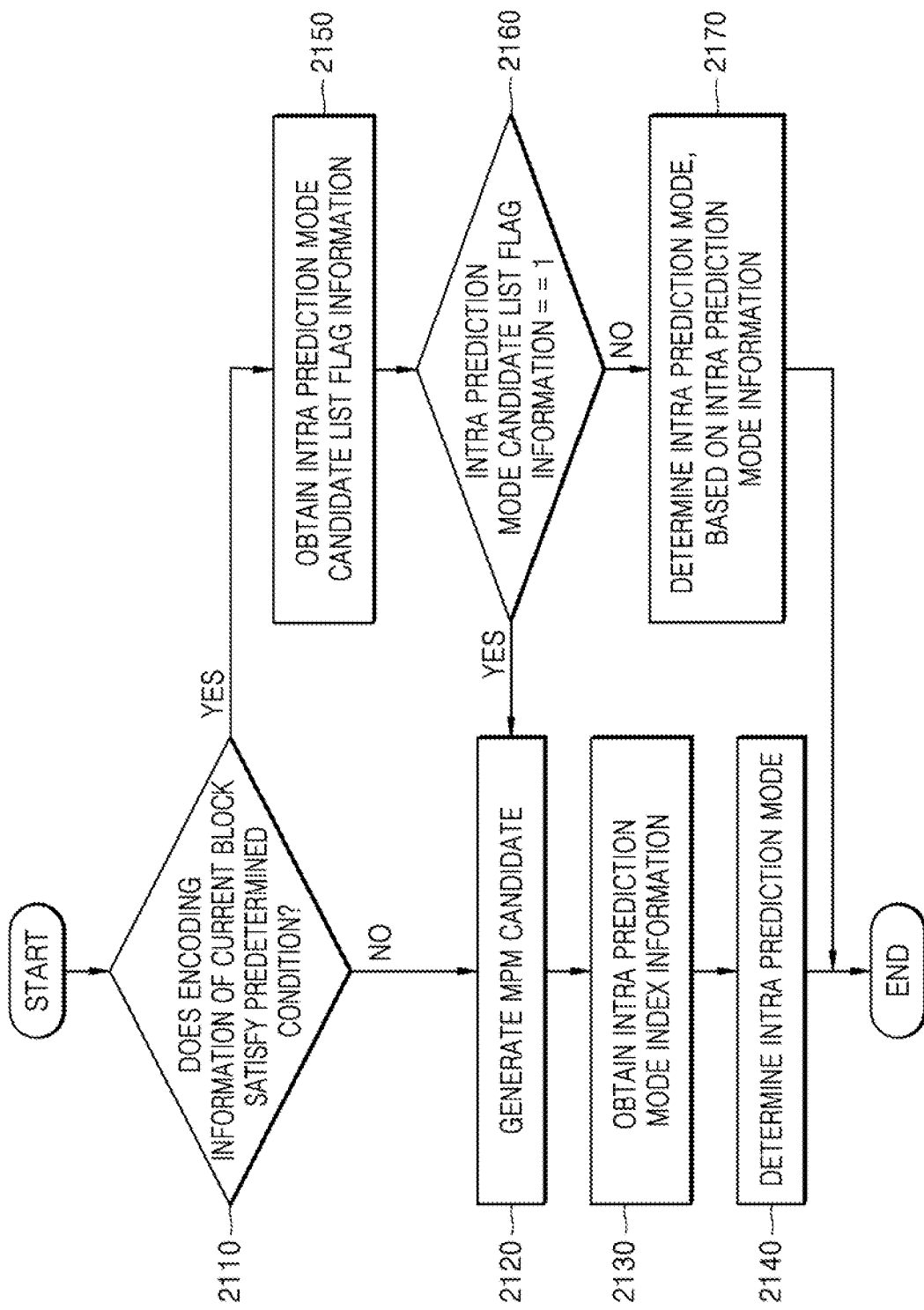
FIG. 21 is a flowchart of a MPM list generation process according to an embodiment.
Figure 22:
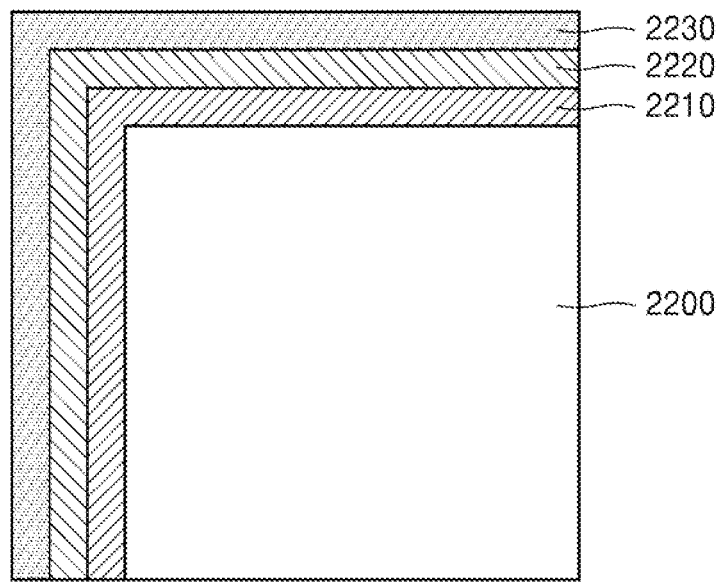
FIG. 22 is a diagram of a reference sample according to an embodiment.

FIG. 21 is a flowchart of a MPM list generation process according to an embodiment, and FIG. 22 is a diagram of a reference sample according to an embodiment.

Referring to FIG. 21, in operation 2110, it is determined, based on encoding information of a current block, whether an intra prediction mode of the current block is to be determined from an intra prediction mode candidate list obtained by using a plurality of pieces of prediction mode information of adjacent blocks adjacent to the current block. That is, whether to use a MPM list may be determined based on encoding information related to the current block. The encoding information may include reference sample information to be used in intra prediction with respect to the current block, and sub-partition information indicating whether the current block is to be split into sub-partitions. According to various embodiments, not only a pixel adjacent to the current block but also a pixel distant from the current block by a predetermined distance may be used as the reference sample in the intra prediction. Referring to FIG. 22, not only pixels 2210 directly adjacent to a current block 2200 but also pixels 2220 and 2230 distant by a predetermined distance from a top boundary and a left boundary of the current block 2200 may be used as the reference sample in the intra prediction. Reference sample information indicating a reference sample from among the adjacent pixels 2210, 2220, and 2230 of the current block 2200 may be signaled from an encoder to a decoder.

A predetermined condition for determining whether an intra prediction mode of a current block is to be determined by using a MPM list may be variously set. For example, the image decoding apparatus 100 may obtain reference sample information and sub-partition information from a bitstream, may determine, based on the reference sample information, (a) whether an adjacent pixel directly adjacent to a current block is to be used as a reference sample of the current block, and may determine, based on the sub-partition information, (b) whether the current block is to be split into sub-partitions. Afterward, the image decoding apparatus 100 may determine, based on results of the determinations of (a) and (b), whether one of candidate intra prediction modes included in a MPM list is to be used as an intra prediction mode of the current block. Also, according to an embodiment, separate flag information indicating whether one of the candidate intra prediction modes included in the MPM list is to be used in the intra prediction mode of the current block may be set. Even when a separate flag is set, in a case where a particular non-angular prediction mode flag indicating whether the intra prediction mode of the current block is a particular non-angular prediction mode is set, and the intra prediction mode of the current block is the particular non-angular prediction mode, the intra prediction mode of the current block may be determined without using the MPM list.

As a result of the determination in operation 2110, when (a') the adjacent pixel directly adjacent to the current block is to not be used as the reference sample of the current block or (b') the current block is to be split into the sub-partitions, it is determined that the MPM list is to be used, and in operation 2120, the image decoding apparatus 100 generates MPM candidates to be included in the MPM list. That is, at least one of a condition of (a') or a condition of (b') is satisfied, the image decoding apparatus 100 determines to use the MPM list.

As a result of the determination in operation 2110, when (a") the adjacent pixel directly adjacent to the current block is to be used as the reference sample of the current block and (b") the current block is to not be split into the sub-partitions, in operation 2150, the image decoding apparatus 100 obtains, from a bitstream, intra prediction mode candidate list flag information (intra_luma_mpm_flag) indicating whether to use the MPM list. In operation 2160, the image decoding apparatus 100 may determine whether to use the MPM list, based on the obtained intra prediction mode candidate list flag information (intra_luma_mpm_flag). For example, when the intra prediction mode candidate list flag information (intra_luma_mpm_flag) corresponds to 1, the image decoding apparatus 100 may generate the MPM candidates to be included in the MPM list. When the intra prediction mode candidate list flag information (intra_luma_mpm_flag) corresponds to 0, in operation 2170, the image decoding apparatus 100 obtains, from the bitstream, remainder intra prediction mode information (intra_luma_mpm_remainder) of the current block, and determines the intra prediction mode of the current block by using the remainder intra prediction mode information. The remainder intra prediction mode information indicates one of intra prediction modes that are not included in the MPM list from among intra prediction modes applicable to the current block. According to an embodiment, when the predetermined condition is satisfied, the image decoding apparatus 100 may determine to unconditionally use the MPM list, and even when the predetermined condition is not satisfied, the image decoding apparatus 100 may determine whether to use the MPM list, based on a flag separately indicating whether to use the MPM list.

When at least one condition of (a') or (b') described above is satisfied, or the intra prediction mode candidate list flag information (intra_luma_mpm_flag) indicates that the MPM list is to be used, in operation 2120 described above, the image decoding apparatus 100 generates the MPM list including the MPM candidates. In operation 2130, the image decoding apparatus 100 obtains MPM index (MPM idx) information indicating one of intra prediction mode candidates included in the MPM list.

According to an embodiment, the image decoding apparatus 100 obtains non-angular intra prediction mode information indicating whether the intra prediction mode of the current block is a particular non-angular intra prediction mode. The particular non-angular intra prediction mode may be one of non-angular intra prediction modes including a DC mode, a planar mode, a plane mode, a bi-linear mode, or the like. When the non-angular intra prediction mode information indicates the particular non-angular intra prediction mode, the image decoding apparatus 100 determines the intra prediction mode of the current block to be the particular non-angular intra prediction mode, and when the non-angular intra prediction mode information does not indicate the particular non-angular intra prediction mode, the image decoding apparatus 100 obtains, from a bitstream, intra prediction mode index information indicating one in an intra prediction mode candidate list obtained based on prediction mode information of an adjacent block adjacent to the current block. Afterward, the image decoding apparatus 100 may determine the intra prediction mode of the current block by using the obtained intra prediction mode index information (MPM idx), and may perform intra prediction on the current block by using the intra prediction mode of the current block. The reason why it is determined whether it is a planar mode, before MPM index information is obtained, is because, in many cases, the planar mode is determined to be the intra prediction mode.

The number of the intra prediction mode candidates included in the MPM list may vary. For example, the number of the intra prediction mode candidates to be included in the MPM list may be determined to be proportional or inverse-proportional to a size of the current block. According to another embodiment, the intra prediction mode information may include i) information indicating a part to which the intra prediction mode of the current block belongs from among a horizontal part and a vertical part, and ii) information indicating one of intra prediction modes included in the part. Referring back to FIG. 19, the image encoding apparatus 150 may add, to a bitstream, information about to which part the intra prediction mode of the current block belongs from among vertical-part intra prediction modes and horizontal-part intra prediction modes. For example, to which part the intra prediction mode of the current block belongs from among vertical-part intra prediction modes and horizontal-part intra prediction modes may be represented by using flag information of 1 bit. The first intra prediction mode 1910 with a direction of 135 degrees may be included in a predetermined part from among the horizontal part and the vertical part. Information indicating one of intra prediction modes included in the part may be represented by using a MPM, or may be represented as a value of 0 to (n−1), the value indicating one of n intra prediction modes (where n is a positive integer) included in the part. The image decoding apparatus 100 may first obtain information indicating the part to which the intra prediction mode of the current block belongs from among the horizontal part and the vertical part, and then may determine the intra prediction mode of the current block by using information indicating one of intra prediction modes included in the part.

When the image encoding apparatus 150 sets a MPM list according to various embodiments and adds the intra prediction mode of the current block to a bitstream by using the MPM list, the image encoding apparatus 150 may separately include the information indicating the part to which the intra prediction mode of the current block belongs from among the horizontal part and the vertical part.

Also, according to another embodiment, the information indicating the part to which the intra prediction mode of the current block belongs from among the horizontal part and the vertical part may not be separately included in the bitstream, and the intra prediction mode of the current block may be determined by using width and height information and size information of the current block, and intra prediction mode information of an adjacent block. For example, when a height of the current block is greater than its width, the intra prediction mode of the current block may be determined to be one of the vertical-part intra prediction modes, and when a width of the current block is greater than its height, the intra prediction mode of the current block may be determined to be one of the horizontal-part intra prediction modes.

According to another embodiment, the intra prediction mode of the current block may be represented by using a two-dimensional vector (vx, vy) (where vx, vy are each a real number) indicating a direction of a reference pixel from a current pixel to be intra predicted.

Figure 23:
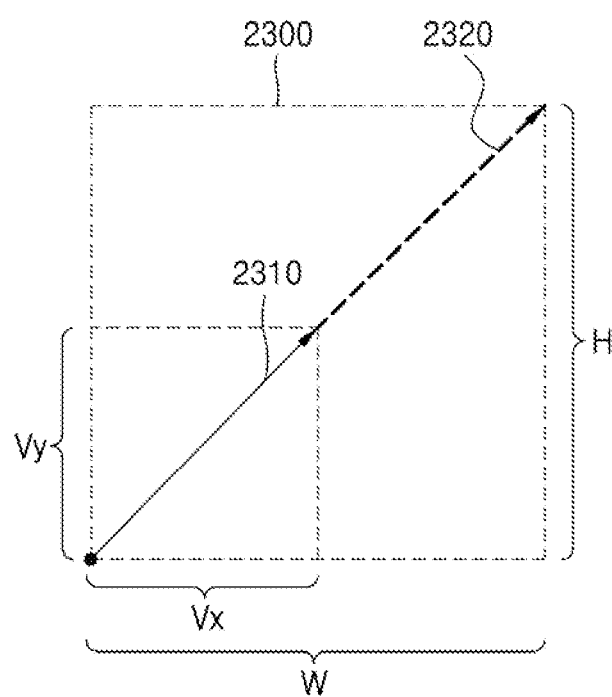
FIG. 23 is a reference diagram for describing a way of representing an intra prediction mode as a vector, according to another embodiment.

FIG. 23 is a reference diagram for describing a way of representing an intra prediction mode as a vector, according to another embodiment. Referring to FIG. 23, it is assumed that a current pixel is predicted by using a reference pixel spaced apart by a horizontal axis of W and a vertical axis of H. Because all pixels in a block have a same intra prediction direction, a prediction direction indicated by an intra prediction mode may be represented as a two-dimensional vector 2320 of (W, H). Instead of a two-dimensional vector of (W, H) indicating the intra prediction mode, a vector (vx, vy) 2310 as a representative vector whose value is 1 and that indicates a same direction as the two-dimensional vector of (W, H) may be used. That is, the two-dimensional vector of (W, H) may be normalized to allow a value of $vx^2+vy^2$ to be 1, such that the two-dimensional vector (vx, vy) 2310 indicating an intra prediction mode of a current block may be obtained. In this manner, when a two-dimensional vector (vx, vy) is used as intra prediction mode information, various prediction directions may be indicated, compared to intra prediction modes in a predetermined direction that is previously set.

According to an embodiment, the number and type of intra prediction modes may vary according to an MPM index or intra prediction modes included in a MPM list. For example, when the MPM list includes an intra prediction mode whose value of predModeIntra is 50, intra prediction modes in a similar direction to the intra prediction mode whose value of predModeIntra is 50 may be further included in candidate intra prediction modes. Also, the MPM list may be divided into a predetermined number of groups according to values of predModeIntra included in the MPM list, and pre-set intra prediction modes may be determined according to the groups of the MPM list.

According to an embodiment, the number of intra prediction modes may be determined based on a value of Quantization Parameter (QP). For example, the number of available intra prediction modes may be determined to be inverse-proportional to a QP value of a current block. Also, when the QP value of the current block is smaller than a predetermined threshold value, the number of available intra prediction modes may be set to be M (where M is a positive integer), and when the QP value of the current block is equal to or greater than the predetermined threshold value, the number of available intra prediction modes may be set to be N (where M>N, N is a positive integer).

According to an embodiment, intra prediction modes may be included in the MPM list according to a predetermined priority order. It is assumed that, when N intra prediction modes are included in the MPM list, an MPM index (MPM idx) indicating one of N candidates may have an integer value from 0 to (N−1), and when a value of the MPM index (MPM idx) is decreased, an intra prediction mode thereto is a mode having a higher priority. According to an embodiment, a priority order of the intra prediction modes included in the MPM list may be determined based on frequencies of intra prediction modes of adjacent blocks. For example, higher priorities of the MPM list, i.e., smaller MPM indices, may be set in order of higher frequencies of the intra prediction modes of the adjacent blocks.

According to another embodiment, a priority order of the intra prediction modes of the adjacent blocks included in the MPM list may be determined, in consideration of sizes and shapes of the current block and the adjacent blocks.

Figure 24A:
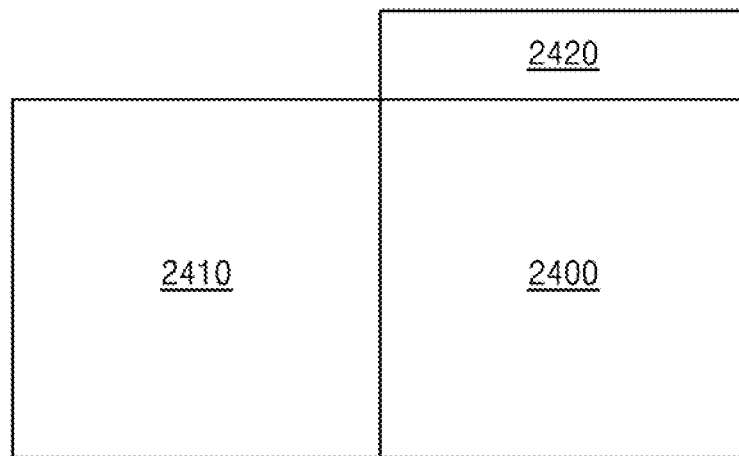
FIGS. 24A to 24C are reference diagrams for describing a priority order of intra prediction modes of adjacent blocks included in an MPM list, in consideration of sizes of a current block and the adjacent blocks.
Figure 24B:
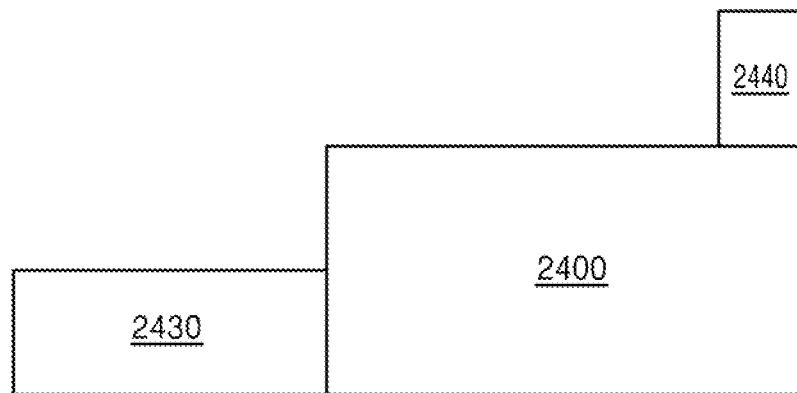
Figure 24C:
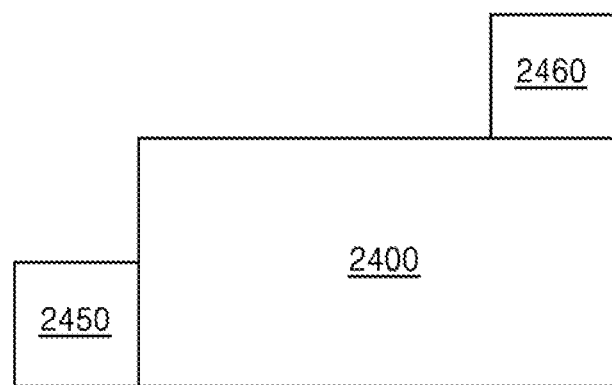

FIGS. 24A to 24C are reference diagrams for describing a priority order of intra prediction modes of adjacent blocks included in an MPM list, in consideration of sizes of a current block and the adjacent blocks.

According to another embodiment, an intra prediction mode of an adjacent block having a similar size as the current block may be disposed at a higher priority in the MPM list. Referring to FIG. 24A, from among a left adjacent block 2410 and an upper adjacent block 2420 of a current block 2400, an intra prediction mode of the left adjacent block 2410 having a same size as the current block 2400 may be set to be disposed at a higher priority in a MPM list, compared to an intra prediction mode of the upper adjacent block 2420.

Also, an intra prediction mode of an adjacent block having a similar shape as a current block may be set to be disposed at a higher priority in a MPM list. Referring to FIG. 24B, when the current block 2400 has a non-square shape whose width is greater than its height, an intra prediction mode of a left adjacent block 2430 having a non-square shape whose width is greater than its height, which is similar to the current block 2400, from among the left adjacent block 2430 and an upper adjacent block 2440, may be set to be disposed at a higher priority in a MPM list, compared to an intra prediction mode of the upper adjacent block 2440.

Also, when a current block has a non-square shape, an intra prediction mode of an adjacent block in a direction along a long side of the current block may be set to be disposed at a higher priority in a MPM list. Referring to FIG. 24C, when the current block 2400 has a non-square shape whose width is greater than its height, an intra prediction mode of an upper adjacent block 2460 adjacent to a width direction of the current block 2400 from among adjacent blocks 2450 and 2460 having an equal size may be set to be disposed at a higher priority in a MPM list, compared to an intra prediction mode of the left adjacent block 2450.

Figure 25:
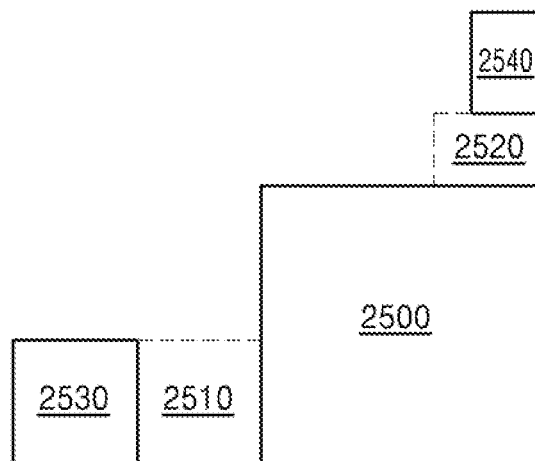
FIG. 25 is a diagram illustrating adjacent blocks of a current block, which are used in a MPM list, according to another embodiment.

FIG. 25 is a diagram illustrating adjacent blocks of a current block, which are used in a MPM list, according to another embodiment.

According to another embodiment, instead of an intra prediction mode of an adjacent block directly adjacent to a current block, an intra prediction mode of adjacent block that is not adjacent to the current block and is spaced apart by a predetermined distance may be included in a MPM list. Referring to FIG. 25, instead of adjacent blocks 2510 and 2520 that are directly adjacent to a current block 2500, intra prediction modes of adjacent blocks 2530 and 2540 spaced apart by a predetermined distance may be used in setting a MPM list. Exceptionally, instead of an intra prediction mode having a highest probability from intra prediction modes of adjacent blocks of a current block, a least probable mode having a smallest probability may be included in a MPM list.

According to various embodiments, a MPM list may be set by using intra prediction modes of a left block and an upper block, and then an additional MPM list may be set by using intra prediction modes included in the MPM list. Hereinafter, the first set MPM list is referred to as the default MPM list. The reason why the additional MPM list in addition to the default MPM list is set is to cover a case where an intra prediction mode that is not included in the first set default MPM list is determined to be an intra prediction mode of a current block. The additional MPM list may include intra prediction modes having predModeIntra obtained by adding or subtracting in a logarithmic scale a predetermined value to or from values of predModeIntra of intra prediction modes included in the default MPM list. For example, when a value of predModeIntra of random intra prediction modes included in an existing MPM list is a default, an additional MPM list may include intra prediction modes having values of predModeIntra of default±1, default±2, default±4, default±8, default±16, and default±32. The number of remainder intra prediction modes that are to not be included in a default MPM list and an additional MPM list may be first determined, and the number of intra prediction modes to be included in the default MPM list and the number of intra prediction modes to be included in the additional MPM list may be determined. A default MPM list and an additional MPM list may be applied according to stages. That is, whether an intra prediction mode of a current block is included in the default MPM list is first determined, and then, when the intra prediction mode of the current block is not included in the default MPM list, the additional MPM list may be set. The additional MPM list may be encoded by using Truncated Unary (TU) Binarization encoding, based on the number of intra prediction modes included therein.

When an intra prediction mode of a current block is not included in a MPM list, the image encoding apparatus 150 separately signals intra prediction mode information of the current block. Hereinafter, an intra prediction mode of a current block which is not included in a MPM list and is separately transmitted is referred to as remainder intra prediction mode information (intra_mpm_remainder). As the remainder intra prediction mode information, a difference value between an intra prediction mode index (predModeIntra_current) of the current block and a reference intra prediction mode index (predModeIntra_MPM) from among intra prediction modes of the MPM list may be used. For example, when the intra prediction mode index (predModeIntra_current) of the current block is 30, and an intra prediction mode index (predModeIntra_MPM) of a reference intra prediction mode determined from the MPM list is 20, only a value of 10 corresponding to (30−20) may be used as the remainder intra prediction mode information. The image encoding apparatus 150 may add, to a bitstream, a difference value of 10 as the remainder intra prediction mode information and transmit the bitstream, and the image decoding apparatus 100 may determine the intra prediction mode of the current block by adding the difference value of 10 obtained from the bitstream to the intra prediction mode index of 20 of the reference intra prediction mode.

According to an embodiment, a MPM list may be generated, in consideration of at least one of a size and shape of a current block and a size of a picture.

Referring back to FIG. 20, according to another embodiment, when a current block has a non-square shape, instead of intra prediction modes included in a MPM list, by using maxAB, an intra prediction mode of an adjacent block which is similar to a direction in which the current block has a greater length from among a width and a height of the current block may be included in the MPM list. In detail, when the current block has a non-square shape whose height is greater than its width, an intra prediction mode of an adjacent block that is relatively close to a vertical direction that is a height direction from among the prediction mode A of the left adjacent block 2020 and the prediction mode B of the upper adjacent block 2030 may be substituted with maxAB. On the other hand, when the current block has a non-square shape whose width is greater than its height, an intra prediction mode of an adjacent block that is relatively close to a horizontal direction that is a width direction from among the prediction mode A of the left adjacent block 2020 and the prediction mode B of the upper adjacent block 2030 may be substituted with maxAB. For example, referring back to FIG. 18, when it is assumed that a current block has a non-square shape with a size of 16×32 where a height is greater than a width, and an intra prediction mode index A of the left adjacent block 2020 is 22 close to a horizontal direction and an intra prediction mode index B of the upper adjacent block 2030 is 54 close to a vertical direction, 54 that is a value of the intra prediction mode index B of the upper adjacent block 2030 which is close to the vertical direction may be used as a value of maxAB used when a MPM list is set.

According to another embodiment, when a size of a block is increased, a probability that a DC mode or a planar mode is to be selected is increased, and thus, for a block with a size equal to or greater than a predetermined size, the planar mode and the DC mode may be set at a higher priority order of a MPM list. For example, the planar mode may be set as MPM[0] that is a top priority order, and the DC mode may be set as MPM[1] that is a second-top priority order. When a size of the block is small, similarity to intra prediction modes of adjacent blocks are is great, and thus, intra prediction modes of an upper adjacent block and a left adjacent block may be set at a high priority of the MPM list.

According to another embodiment, when a resolution of a picture is increased, a probability that a flat area is increased is great, and thus, a priority order of non-angular intra prediction modes may be set at a high priority of a MPM list. For example, when the resolution is equal to or greater than 4K that is a predetermined threshold value, the DC mode and the planar mode may be set at a higher priority order of the MPM list.

According to another embodiment, when a MPM list generated in prediction of an intra prediction block that was previously processed is stored as a look-up table, and an intra prediction block to be processed thereafter is processed, the MPM list stored as the look-up table may be used. Also, the MPM list may be updated whenever each intra prediction block is processed. The non-angular intra prediction modes may be set in a higher priority order of mpm[0] and mpm[1], and angular intra prediction modes may be set in a lower priority order of mpm[2-5]. After a MPM list is generated, intra prediction modes and a priority order included in the MPM list may be changed by using a MPM ordering table. For example, it is assumed that the MPM list is set as {DC, Planar, H, V, A, B, A+n, A−n, B+n, B−n}. In this regard, H refers to a horizontal-direction intra prediction mode, V refers to a vertical-direction intra prediction mode, A refers to an intra prediction mode of a left adjacent block, B refers to an intra prediction mode of an upper adjacent block, and n refers to a predetermined integer (e.g., n is 1 or 2). Also, a number included in the MPM ordering table refers to an array address of the MPM list. When the MPM ordering table corresponds to {0, 1, 4, 5, 6, 7}, intra prediction modes of mpm[0], mpm[1], mpm[4], mpm[5], mpm[6], and mpm[7] of the MPM list are selected, and thus, a MPM list of {DC, Planar, V, A, B, A+n, A−n} may be newly obtained.

Also, MPM lists that are previously generated are stored, in consideration of tool types applied to previously-processed intra prediction blocks or a size and shape of a previous block, and then a MPM list of a previously-processed intra block with a same condition may be used for an intra block to be processed thereafter.

According to another embodiment, when a current block does not use a reference pixel that is directly adjacent, an MPM list that excludes a DC mode and a planar mode and is from an MPM list obtained by using intra prediction modes of adjacent blocks of the current block may be used. Also, as described above, instead of maxAB used when an intra prediction mode of a left adjacent block and an intra prediction mode of an upper adjacent block are different, minAB that is a smaller intra prediction mode index from among intra prediction mode indices A and B of the left adjacent block and the upper adjacent block may be used. That is, when the intra prediction mode index (predModeIntra) of the left adjacent block is A, and the intra prediction mode index (predModeIntra) of the right adjacent block is B, minAB that is obtained through minAB=Min(A, B) may be used instead of maxAB.

According to another embodiment, a MPM list may include {V, H, 34, 2, 66} as a default, and then an average value horizontal-part intra prediction modes and an average value of vertical-part intra prediction modes from among intra prediction modes obtained from an intra prediction mode of a left adjacent block and an intra prediction mode of an upper adjacent block may be included in an additional MPM list. According to another embodiment, an intra prediction mode corresponding to an intra prediction mode index of a value obtained by adding or subtracting a predetermined offset (e.g., the offset is an integer equal to or greater than 1) to or from an intra prediction mode index of an adjacent block which is excluded when the MPM list is generated may be included in the additional MPM list. As described above, when an adjacent block is not available when the MPM list is generated, an intra prediction mode of an adjacent block may be set as a planar mode as a default.

Figure 26:
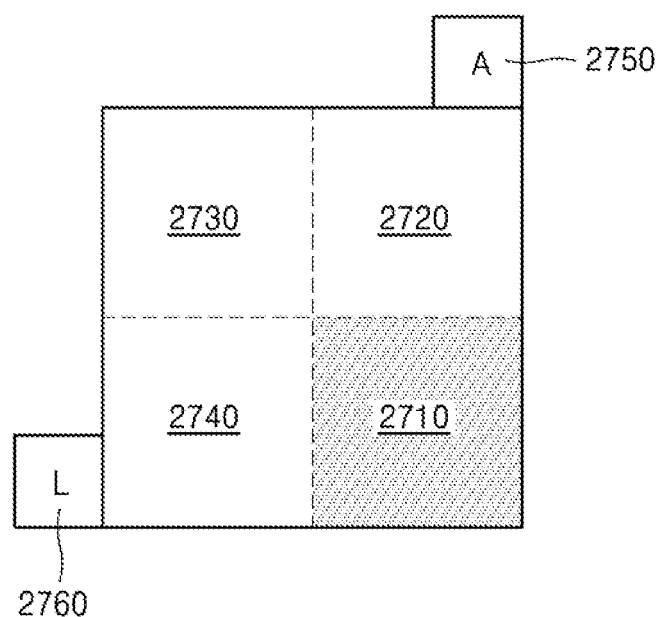
FIG. 26 is a reference diagram illustrating a scheme of generating a MPM list in parallel-processing, according to an embodiment.

FIG. 26 is a reference diagram illustrating a scheme of generating a MPM list in parallel-processing, according to an embodiment.

According to an embodiment, an upper adjacent block and a left adjacent block that are used in generation of a MPM list of a plurality of blocks to be parallel processed may be equal. Referring to FIG. 26, for parallel processing of blocks 2710, 2720, 2730, and 2740, the blocks 2710, 2720, 2730, and 2740 are needed to be independently parsed or decoded. In particular, when the blocks 2710, 2720, 2730, and 2740 are all intra-predicted blocks, a common MPM list may be applied to the blocks 2710, 2720, 2730, and 2740 so as to enable parallel processing with respect to the blocks 2710, 2720, 2730, and 2740. That is, the MPM list used in determination of an intra prediction mode of the blocks 2710, 2720, 2730, and 2740 is obtained by using intra prediction modes of an upper adjacent block A 2750 and a left adjacent block L 2760 of a parallel-processing data unit where the blocks 2710, 2720, 2730, and 2740 are combined.

FIG. 27 illustrates a look-up table showing mapping relations between intra prediction mode indices (predModeIntra) and angle parameters (IntraPredAngle) according to intra prediction modes, according to an embodiment, and FIG. 28 illustrates a look-up table showing mapping relations between intra prediction mode indices (predModeIntra) and angle parameters (IntraPredAngle) according to intra prediction modes, according to another embodiment.

A particular direction of intra prediction modes according to various embodiments described above may be represented by using an angle parameter IntraPredAngle about a particular direction based on an intra prediction mode index (predModeIntra), except for a vertical direction of 90 degrees and a horizontal direction of 180 degrees. For example, a direction of horizontal-part intra prediction modes may have a direction of tan−1(intraPredAngle/fixed number) by using a fixed number in a horizontal direction and an angle parameter IntraPredAngle in a vertical direction, and a direction of vertical-part intra prediction modes may have a direction of $\tan^{-1}$(fixed number/intraPredAngle) by using an angle parameter IntraPredAngle in a horizontal direction and a fixed number in a vertical direction. In this regard, the fixed number may be a power of 2. For example, the fixed number may be one of 32, 64, and 128.

Figure 29:
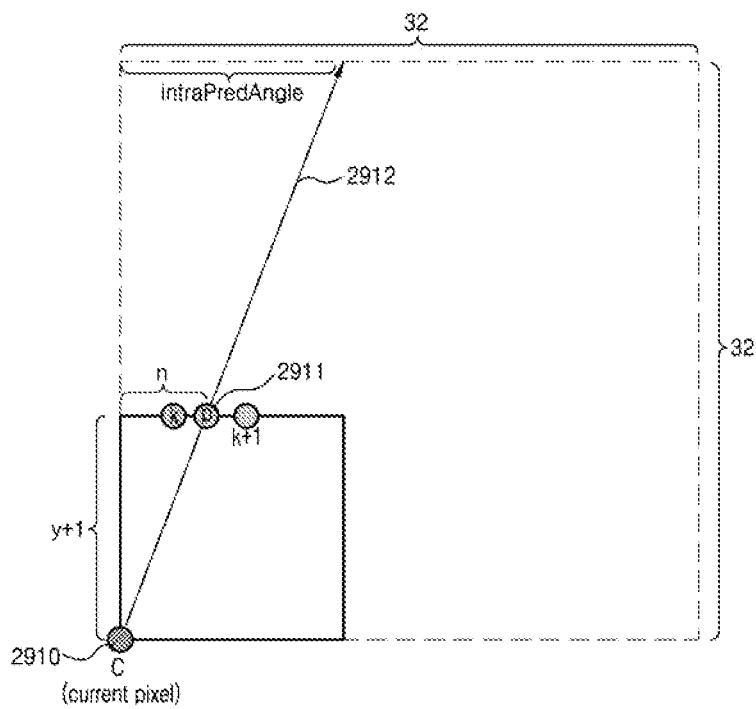
FIG. 29 is a reference diagram for describing angle parameters IntraPredAngle related to intra prediction mode directions, according to embodiments.

FIG. 29 is a reference diagram for describing angle parameters IntraPredAngle related to intra prediction mode directions, according to embodiments.

A prediction direction based on an intra prediction mode may be indicated by using a fixed number in a horizontal direction and an angle parameter IntraPredAngle in a vertical direction, or may be indicated by using the angle parameter IntraPredAngle in a horizontal direction and a fixed number in a vertical direction. For example, referring to FIG. 29, a particular direction 2912 with respect to a current pixel 2910 has the angle of $\tan^{-1}$(32/intraPredAngle) (deg) or (90−$\tan^{-1}$(32/intraPredAngle) (deg) by using the angle parameter IntraPredAngle in a horizontal direction and a fixed number of 32 in a vertical direction.

In intra prediction, an adjacent pixel may be determined by using a fixed number and the angle parameter IntraPredAngle.

A process of determining an adjacent pixel 2911 pointed by the particular direction 2911 with respect to the current pixel 2910 will now be described. It is assumed that a location difference in a vertical direction between the current pixel 2910 and the adjacent pixel 2911 is n. In this regard, based on a trigonometrical function, a proportional relationship corresponding to (y+1): n=32: intraPredAngle is established. From the proportional relationship, n=(y+1)*intraPredAngle/32 may be derived. An operation of n=(y+1) *intraPredAngle/32 may be performed through a bit operation as n=(y+1)*intraPredAngle>>5. In this manner, a location of an adjacent pixel may be determined by using intraPredAngle provided that a size of a current block and a location of the current pixel 2910 are known.

When a value of (y+1)*intraPredAngle is a multiple of 32, p indicates an adjacent pixel at an integer location, and when the value of (y+1)*intraPredAngle is not a multiple of 32, a particular direction based on intraPredAngle indicates a gap between two adjacent pixels (k and k+1). When the particular direction based on intraPredAngle indicates the gap between the two adjacent pixels (k and k+1), a weighted average value of the two adjacent pixels (k and k+1) may be used as a prediction value of the current pixel 2910.

In intra prediction, an adjacent pixel in a particular direction is used as a reference pixel, i.e., a prediction value, for the current pixel 2910. On condition of a fixed number in a horizontal or vertical direction, directions of angular intra prediction modes may be indicated by using one parameter of the angle parameter IntraPredAngle. Therefore, as described above with reference to FIGS. 27 and 28, the angle parameter IntraPredAngle indicating particular directions of angular intra prediction modes corresponding to intra prediction mode indices (predModeIntra) of intra prediction modes may be predetermined in the form of a look-up table.

The disclosure has been particularly shown and described with reference to embodiments thereof. In this regard, it will be understood by one of ordinary skill in the art that various changes in form and details may be made therein without departing from the scope of the disclosure. Therefore, the embodiments should be considered in a descriptive sense only and not for purposes of limitation. The scope of the disclosure is defined not by the detailed descriptions of the disclosure but by the following claims, and all differences within the scope will be construed as being included in the disclosure.

Meanwhile, the aforedescribed embodiments of the disclosure can be written as a program executable on a computer, and can be implemented in general-use digital computers that execute the program by using a computer-readable recording medium. Examples of the computer-readable recording medium include magnetic storage media (e.g., ROM, floppy disks, hard disks, etc.), optical recording media (e.g., CD-ROMs, or DVDs), or the like.

The invention claimed is:

1. A video decoding method, comprising:
extracting, from a bitstream, reference sample information indicating reference samples among a plurality of adjacent samples including first adjacent samples and second adjacent samples;
when the reference sample information does not indicate the first adjacent samples, determining an intra prediction mode candidate list, for a current block, including a plurality of candidate intra prediction modes excluding a planar mode;
obtaining, from the bitstream, an index indicating an intra prediction mode for the current block among the plurality of candidate intra prediction modes; and
generating predicted samples of the current block using the intra prediction mode for the current block and the second adjacent samples,
wherein:
the first adjacent samples include an adjacent sample directly adjacent to the current block,
the second adjacent samples include an adjacent sample being above the adjacent sample directly adjacent to the current block,
the adjacent sample being above the adjacent sample directly adjacent to the current block is one line away from the current block, and
the plurality of candidate intra prediction modes are determined using an intra prediction mode of a left neighboring block of the current block and an intra prediction mode of an upper neighboring block of the current block.

2. A video encoding method, comprising:
generating reference sample information indicating reference samples among a plurality of adjacent samples including first adjacent samples and second adjacent samples;
when the reference sample information does not indicate the first adjacent samples, determining a intra prediction mode candidate list, for a current block, including a plurality of candidate intra prediction modes excluding a planar mode;

generating an index indicating an intra prediction mode for the current block among the plurality of candidate intra prediction modes; and generating predicted samples of the current block using the intra prediction mode for the current block and the second adjacent samples, wherein:
- the first adjacent samples include an adjacent sample directly adjacent to the current block,
- the second adjacent samples include an adjacent sample being above the adjacent sample directly adjacent to the current block,
- the adjacent sample being above the adjacent sample directly adjacent to the current block is one line away from the current block, and
- the plurality of candidate intra prediction modes are determined using an intra prediction mode of a left neighboring block of the current block and an intra prediction mode of an upper neighboring block of the current block.

3. A non-transitory computer-readable medium for recording a bitstream, the bitstream comprising:

reference sample information indicating reference samples among a plurality of adjacent samples including first adjacent samples and second adjacent samples; and an index indicating an intra prediction mode for a current block among a plurality of candidate intra prediction modes, wherein the reference sample information and the index are obtained by:
- generating the reference sample information;
- when the reference sample information does not indicate the first adjacent samples, determining a intra prediction mode candidate list, for the current block, including the plurality of candidate intra prediction modes excluding a planar mode;
- generating the index; and
- generating predicted samples of the current block using the intra prediction mode for the current block and the second adjacent samples, and wherein:
- the first adjacent samples include an adjacent sample directly adjacent to the current block,
- the second adjacent samples include an adjacent sample being above the adjacent sample directly adjacent to the current block,
- the adjacent sample being above the adjacent sample directly adjacent to the current block is one line away from the current block, and
- the plurality of candidate intra prediction modes are determined using an intra prediction mode of a left neighboring block of the current block and an intra prediction mode of an upper neighboring block of the current block.

* * * * *